United States Patent
Lotter et al.

(10) Patent No.: US 8,126,456 B2
(45) Date of Patent: *Feb. 28, 2012

(54) MOBILE COMMUNICATION DEVICE MONITORING SYSTEMS AND METHODS

(75) Inventors: Robert A. Lotter, Newport Beach, CA (US); Timothy S. Allard, Tustin, CA (US)

(73) Assignee: eAgency, Inc., Newport Beach, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/014,494

(22) Filed: Jan. 15, 2008

(65) Prior Publication Data

US 2008/0244704 A1 Oct. 2, 2008

Related U.S. Application Data

(63) Continuation-in-part of application No. 11/695,500, filed on Apr. 2, 2007, now Pat. No. 7,996,005.

(60) Provisional application No. 60/885,384, filed on Jan. 17, 2007.

(51) Int. Cl.
*H04W 4/00* (2009.01)

(52) U.S. Cl. ............. 455/432.3; 455/418; 455/407; 455/408; 455/419; 455/414.1; 726/26

(58) Field of Classification Search ............ 455/410, 455/411, 414.1, 414.2, 418, 419, 428, 432.3, 455/445, 560, 567, 405, 407, 408; 713/168–170; 348/14.01–14.05; 726/26

See application file for complete search history.

(56) References Cited

U.S. PATENT DOCUMENTS

| | | | |
|---|---|---|---|
| 6,282,275 B1 | 8/2001 | Gurbani et al. | |
| 6,345,361 B1 * | 2/2002 | Jerger et al. | 726/3 |
| 6,785,515 B1 | 8/2004 | Sommer et al. | |
| 6,959,182 B2 * | 10/2005 | Lingafeldt et al. | 455/405 |
| 7,046,782 B2 | 5/2006 | Miller | |
| 7,076,041 B2 | 7/2006 | Brown et al. | |
| 7,139,553 B2 | 11/2006 | Alston | |
| 7,231,218 B2 | 6/2007 | Diacakis et al. | |
| 7,257,228 B2 * | 8/2007 | Wheeler et al. | 380/255 |
| 7,327,837 B1 | 2/2008 | Harlow et al. | |
| 7,570,943 B2 * | 8/2009 | Sorvari et al. | 455/414.1 |
| 7,684,792 B2 * | 3/2010 | Lundblade et al. | 455/425 |
| 7,814,163 B2 | 10/2010 | Lee et al. | |
| 8,027,448 B2 * | 9/2011 | Jorasch et al. | 379/210.02 |
| 2002/0143934 A1 * | 10/2002 | Barker et al. | 709/224 |
| 2004/0208304 A1 * | 10/2004 | Miller | 379/210.02 |
| 2005/0086255 A1 * | 4/2005 | Schran et al. | 707/102 |
| 2005/0113113 A1 | 5/2005 | Reed | |
| 2005/0282559 A1 | 12/2005 | Erskine et al. | |
| 2006/0181411 A1 | 8/2006 | Fast et al. | |
| 2006/0190473 A1 * | 8/2006 | Ovsyannikov et al. | 707/102 |
| 2006/0209809 A1 * | 9/2006 | Ellingham et al. | 370/356 |
| 2008/0009268 A1 * | 1/2008 | Ramer et al. | 455/412.1 |
| 2008/0134282 A1 | 6/2008 | Fridman et al. | |
| 2008/0168135 A1 * | 7/2008 | Redlich et al. | 709/204 |
| 2009/0132718 A1 | 5/2009 | Groll et al. | |

* cited by examiner

*Primary Examiner* — Kamran Afshar
*Assistant Examiner* — Mong-Thuy Tran
(74) *Attorney, Agent, or Firm* — Haynes and Boone, LLP

(57) ABSTRACT

Systems and methods are directed to monitoring the communications to and from a mobile communication device in accordance with some embodiments of the present invention. For example in accordance with an embodiment, each of the data services on a mobile communication device may be monitored against rules stored in a central data center repository. The data services may include all forms of communications between the mobile communication device and a third party along with changes to application or data within the mobile communication device. An alert may be provided to an administrator when unauthorized data service activity and/ or a message may be sent to the mobile communication device to prevent the unauthorized data service activity.

38 Claims, 25 Drawing Sheets

Fig. 4A

Activity Log 40

| Record ID | Acct ID | Msg Type | In/Out | Start Time | End Time | CallerID | Log |
|---|---|---|---|---|---|---|---|
| 100 | 200 | Email | In | 23:51:01 1/1/2007 | | buddy@abc.com | Did you find... |
| 101 | 200 | Phone | Out | 22:42:01 1/1/2007 | 22:45:56 1/1/2007 | 213-555-1212 | |
| 102 | 201 | SMS | In | 22:35:26 1/1/2007 | | 909-123-1234 | Meet me at 4... |
| 103 | 200 | Email | Out | 18:15:21 1/1/2007 | | john@acme.com | Want a better... |
| 104 | 202 | IM | Out | 16:12:09 1/1/2007 | | mypal12 | Hey John... |
| 105 | 202 | Phone | In | 14:20:12 1/1/2007 | 14:36:41 1/1/2007 | 605-852-9797 | |
| 106 | 203 | Email | In | 10:51:32 1/1/2007 | | alice@mx.com | Thanks for calling... |

Fig. 4B

Activity Log 40

| Record ID | Long | Lat | CRC | Auth | Auth ID | Carrier Log Auth |
|---|---|---|---|---|---|---|
| 100 | 33.6235 | 117.8644 | 132132 | Bio | 1101 | N/A |
| 101 | 58.1254 | 111.2154 | 321354 | Password | 1110 | ATT 1235468 |
| 102 | 14.2135 | 25.6448 | 31654 | N/A | N/A | Verizon 123546 |
| 103 | 94.6548 | 96.3215 | 65465496 | Password | 1101 | Rogers 2165468 |
| 104 | 15.1245 | 11.2154 | 2135468 | Bio | 1221 | N/A |
| 105 | 13.2154 | 52.3164 | 3213546 | Bio | 1385 | Sprint 54687978 |
| 106 | 23.1524 | 94.2546 | 032165 | Bio | 2546 | AllTel 24657685 |

Fig. 5

Permissions 50

| Record ID | Acct ID | Data Service | Allow | Deny | Alert Type | Alert Number |
|---|---|---|---|---|---|---|
| 100 | 200 | Email | True | False | Email | alice@acme.com |
| 101 | 200 | Phone | True | False | SMS | 909-123-1234 |
| 102 | 200 | SMS | False | True | Email | alice@acme.com |
| 103 | 201 | Email | True | False | Email | joe@abc.com |
| 104 | 201 | Email | True | False | SMS | 605-852-9797 |
| 105 | 201 | IM | True | False | SMS | 605-852-9797 |
| 106 | 201 | SMS | True | False | Email | john@mx.com |

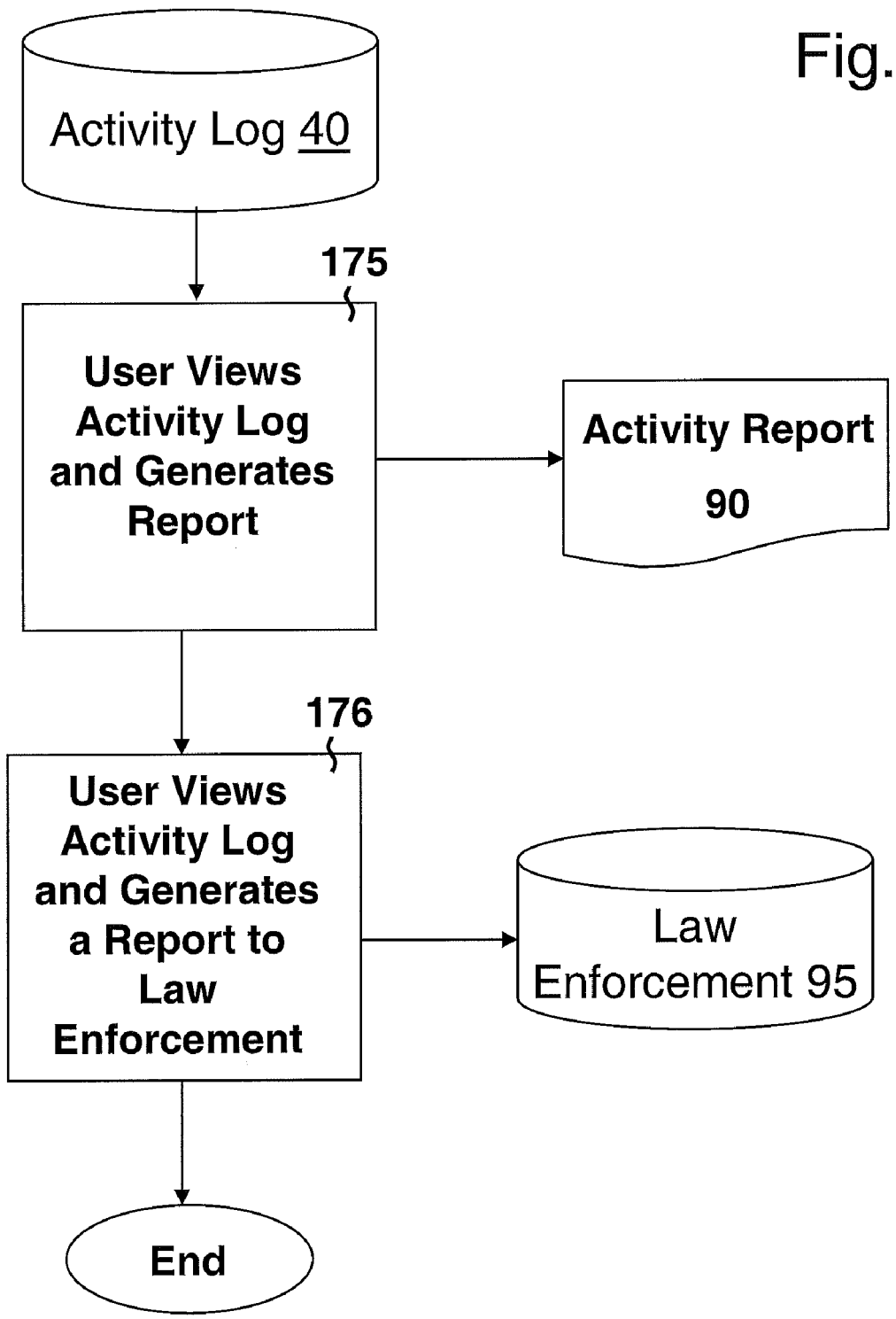

MOBILE COMMUNICATION DEVICE MONITORING SYSTEMS AND METHODS

CROSS-REFERENCE TO RELATED APPLICATIONS

This Continuation-In-Part Patent Application is related to and claims priority to U.S. patent application Ser. No. 11/695,500, filed Apr. 2, 2007 now U.S. Pat. No. 7,996,005, and to U.S. Provisional Patent Application No. 60/885,384, filed Jan. 17, 2007, which are incorporated herein by reference in their entirety.

TECHNICAL FIELD

The present invention relates generally to communication systems and, more particularly, to mobile communication devices and systems and methods for monitoring the communication devices.

BACKGROUND

A 2006 report from the National Center for Missing and Exploited Children (NCMEC) showed that more parents and guardians were using filtering, blocking, and monitoring software on the home computers that their children used most often, but even so, youth exposure to unwanted sexual material increased substantially from the report conducted five years earlier. In the study, thirty four percent of the youth communicated with people online that they did not know. One in seven received unwanted sexual solicitations or approaches in the past year, while fifty six percent of the youths who received an unwanted solicitation did not report the incident to anyone. Almost one third (approximately thirty one percent) of the solicitations were aggressive, meaning the solicitors made or attempted to contact the youth offline, and of the aggressive solicitations, thirty four percent called the youth on the telephone.

The report recommended broader efforts to reduce the risks to youth, but the recommendations were still directed mainly to limiting Internet access from within the home. However, approximately twenty five percent of all teens and pre-teens in the U.S. carry a cell phone and this number is expected to grow significantly over the next several years. All of the Internet services, such as email, instant messaging, text messaging, etc., mentioned in the NCMEC study, are also available on the child's cell phone. In addition, the child is more likely to assume his cell phone activities are private when away from the monitoring software installed on the home computer. Currently, there is no means for parents to monitor their child's Internet and cell phone activities outside of the home.

As a result there is a need for systems and methods that allow parents, guardians, and/or employers to effectively monitor these activities as well as provide additional security, location tracking, and/or prosecution, for example, against unlawful predator activities or other undesirable activities.

SUMMARY

Systems, methods, and program products are disclosed, in accordance with one or more embodiments of the present invention, which are directed to monitoring the communications to and from a wireless data device. For example in accordance with an embodiment, each of the data services on a wireless device, such as a cell phone, a Smartphone, or a personal digital assistant (PDA), may be monitored against the permissions (e.g., rules) stored in a central repository. Data services may include all forms of communications between the device and a third party including, for example, cellular voice calls, a short message service (SMS) text messages, email, instant messaging sessions, and/or the applications used by the data services including, for example, the address book, calendar, and tasks maintained on the wireless device. In accordance with some embodiments, monitoring may be performed for a multitude of communication protocols for sending or receiving data including, for example, protocols associated with cellular networks, personal identification number (PIN)-to-PIN messaging, Wi-Fi standards, Bluetooth standards, Personal Area Networks, Local Area Networks, and/or Public Networks.

According to some embodiments of the present invention, a user may specify the permissions for each data service associated with a wireless device. The user may specify whether use of the service is allowed or denied for any identity that is not currently in the address book of the device. In addition to the forensic information collected and stored regarding the communication transaction, an embodiment of the present invention collects, stores, and analyzes the contextual information contained within the data including text, files, pictures, audio, and/or all other manner of digital and analog content transmitted between a mobile communications device and a third party.

In accordance with some embodiments of the present invention, systems, methods, and program products are disclosed that alerts the user whenever an unauthorized activity is detected. For example, the user may specify one or more methods of notification including email, SMS text message, voice call, and/or any other publicly accepted machine-to-machine communications protocol to alert the user whenever an unauthorized activity is detected. In general in accordance with some embodiments, the type of unauthorized activity being monitored may include any form of information transmission and/or reception (e.g., of audio, photo, video, textual data, or multimedia information) or any type of change to the wireless data device. Similarly in accordance with some embodiments, the user notification of unauthorized activity may be provided in any form of communication, including for example audio, photo, video, textual data, and/or multimedia information.

More specifically in accordance with one or more embodiments of the present invention, a client application installed on a mobile communications device, such as for example a cell phone or PDA, transmits detailed device usage information using a wireless data connection from the device to a central repository accessible from a network (e.g., the Internet). For example, monitoring of device usage may include such things as inbound or outbound phone calls, inbound or outbound SMS Text Messages, inbound or outbound Instant Messages, Web Browser Access, Address Book changes (e.g., Adds, Modifications, and/or Deletions), Calendar Appointment changes (e.g., Adds, Modifications, and/or Deletions), Tasks changes (e.g., Adds, Modifications, and/or Deletions), changes to the installed applications on the device (e.g., Adds, Modifications, and/or Deletions), and/or inbound or outbound multimedia files.

In addition to the client application in accordance with one or more embodiments of the present invention, a web-based monitoring application, which is controlled by an administrative user such as for example a parent or manager, monitors the contents of the central repository. For example, based on rules selected by the administrative user, the device usage is allowed, denied, and/or an alert is sent to the administrative user notifying them of an unauthorized event. In accordance with some embodiments of the present invention, existing location services (e.g., GPS, cell-based location applications, or network-based location applications) may be employed to include the monitoring and alerting of the physical location of the device. Furthermore in accordance with some embodiments, the information stored in the central repository may be signed and/or encrypted to provide secure storage and authentication, such as for chain of custody or other evidentiary reasons.

In accordance with one embodiment of the present invention, a system includes memory configured to store programs and database information; a processor, coupled to the memory, configured to access the database information and run the programs; and a communication gateway, coupled to the processor and the memory, configured to receive information on data service use from a mobile, wireless, communication device being monitored by the system. The database information may include an activity log database configured to store a signed entry for each data service use received from the mobile, wireless, communication device; and a permissions database configured to store rules as to whether the data service use is allowed for the mobile, wireless, communication device. The programs may include an alert monitor program configured to compare the signed entry for each of the data service uses stored in the activity log database to the rules stored in the permissions database and provide an alert if the data service use of the mobile, wireless, communication device is not allowed.

In accordance with another embodiment of the present invention, a mobile communications device includes a memory configured to store programs and data; a processor, coupled to the memory, configured to run the programs stored in the memory; a communications port configured to wirelessly communicate with a data center; and wherein the programs include a data monitor program configured to monitor data service uses of the mobile communications device and compile signed information of the data service uses for transmission to the data center via the communications port, wherein the data service uses comprise inbound and outbound activity between the mobile communications device and a third party and changes to the data stored in the memory.

In accordance with another embodiment of the present invention, a method of monitoring a mobile communication device includes storing rules associated with data service uses for the mobile communication device; receiving information for one of the data service uses from the mobile communication device; signing the information; storing the signed information for the data service use; checking the data service use to the corresponding rule associated with the data service use; and providing an alert if the data service use is unauthorized based on the corresponding rule.

In accordance with another embodiment of the present invention, a method of monitoring a mobile communication device includes monitoring data service uses of the mobile communication device; compiling information of one of the data service uses; and transmitting the information of the data service use to a data center to sign and store the information, wherein the data service uses comprise inbound and outbound activity between the mobile communications device and a third party and changes to data stored in the mobile communication device.

In accordance with another embodiment of the present invention, a computer-readable medium is disclosed on which is stored a computer program for performing a method of monitoring a mobile communication device, the method includes storing rules associated with data service uses for the mobile communication device; receiving information for one of the data service uses from the mobile communication device; storing the information with a signature for the data service use; checking the data service use to the corresponding rule associated with the data service use; and providing an alert if the data service use is unauthorized based on the corresponding rule.

In accordance with another embodiment of the present invention, a computer-readable medium is disclosed on which is stored a computer program for performing a method of monitoring a mobile communication device, the method includes monitoring data service uses of the mobile communication device; compiling information of one of the data service uses; and transmitting the information of the data service use to a data center to store with a digital signature, wherein the data service uses comprise inbound and outbound activity between the mobile communications device and a third party and changes to data stored in the mobile communication device.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A-4B illustrate an exemplary table representation of the Activity Log database of FIG. 1 in accordance with an embodiment of the present invention.

FIG. 5 is an exemplary table representation of the Permissions database of FIG. 1 in accordance with an embodiment of the present invention.

FIG. 8 illustrates an exemplary flowchart of a reporting process in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
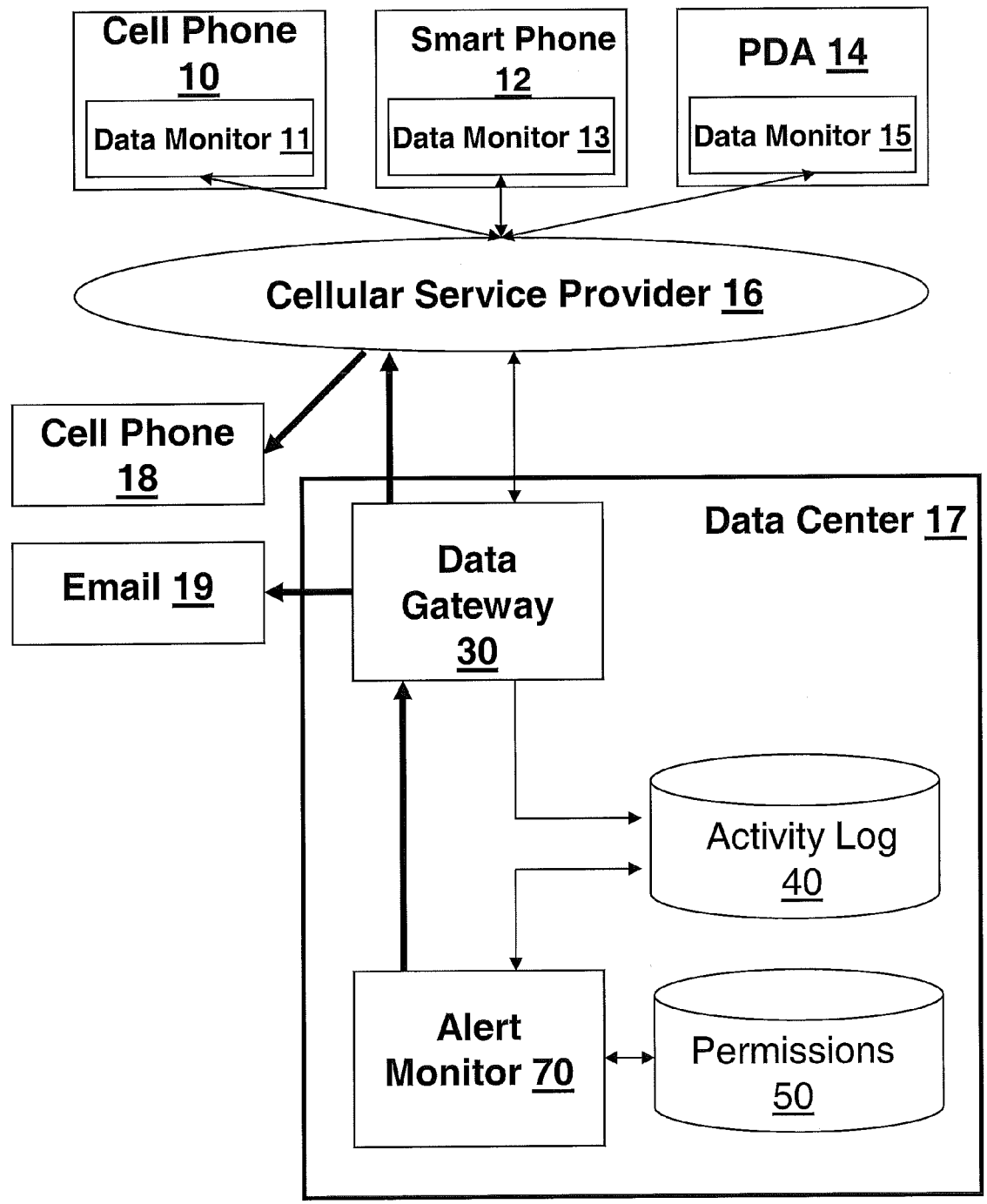
FIG. 1 is a block diagram of a system including a Data Monitor tool to monitor the activities on a wireless device, a Data Gateway for collecting the activity on a wireless device, and an Alert Monitor in accordance with an embodiment of the present invention.

FIG. 1 illustrates a Data Gateway program tool 30 and wireless devices 10, 12, and 14 represent users whose activities are monitored according to an embodiment of the present invention. Each of the devices 10, 12, and 14 may include a respective Data Monitoring program tool 11, 13, and 15 which communicates with the Data Gateway 30. For example, wireless devices 10, 12, and 14 include memory and a processor configured to run various programs (e.g., software applications) stored in the memory, including respective Data Monitoring program tools 11, 13, and 15.

Data services used on the wireless devices 10, 12, and 14 are monitored for activity by their respective Data Monitoring program tool 11, 13, and 15 which communicates (e.g., via a communication port such as through a wireless communication gateway having an antenna) to the Data Gateway 30 via a wireless data connection such as provided by a cellular service provider 16. Alternatively, the devices 10, 12, and 14 may send their activity information through any available communications network (e.g., any standards or protocols) including for example PIN-to-PIN, Wi-Fi, Bluetooth, Personal Area Networks, Local Area Networks, and/or Public Networks (e.g., cellular networks, satellite networks, and/or the Internet).

As described in more detail below, the Data Gateway 30 maintains an Activity Log 40 database in a Data Center 17. Activity Log 40 contains an entry for each use of a data service on wireless devices 10, 12, and 14. As described in more detail below, Data Center 17 also contains a Permissions 50 database that lists the wireless devices to be monitored (e.g., wireless devices 10, 12, and 14) and the rules to apply to allow, deny, and/or alert of data service activity occurring on the wireless devices being monitored.

An Alert Monitor 70 program waits for new entries to be made into Activity Log 40. Each new entry is checked against the Permissions 50 database. Whenever unauthorized activity is detected, Alert Monitor 70 sends an alert to one or more users via Data Gateway 30, such as for example to a cell phone 18 using SMS Text Messaging or an Email 19 account. The preferred method of notification may be maintained in the Permissions 50 database which can support many forms of data communications including voice messages, SMS Text Messages, email, and/or any other publicly accepted machine-to-machine communications protocol.

Data Gateway 30 and Alert Monitor 70, in accordance with one or more embodiments of the present invention, may represent one or more computers (e.g., servers or other processor-based systems) for performing the operations described herein (e.g., by executing software and communicating through a gateway or other communication interface), including communicating with Activity Log 40 and Permissions 50 databases (e.g., memory such as server-based storage). Data Monitoring program tools 11, 13, and 15 may represent, for example, software run by corresponding processors of wireless devices 10, 12, and 14 or may represent hardware-based systems (e.g., separate processors) for performing the desired operations described herein.

Furthermore, the various programs or system elements may be combined or be discreet, as desired for the specific application. For example, Data Gateway 30 and Alert Monitor 70 may represent one computer or software program or separate computers and software programs for performing the various functions disclosed herein. Similarly for example, Activity Log 40 and Permissions 50 databases may represent one memory or discrete memory for storing the information disclosed herein. Additionally, the various programs may be stored on a computer-readable medium that may be programmed or loaded into a particular device. For example, data monitor 11 may be a software program stored on a computer-readable medium or otherwise provided to and programmed into wireless device 10 to perform the desired functions as described herein.

Figure 2:
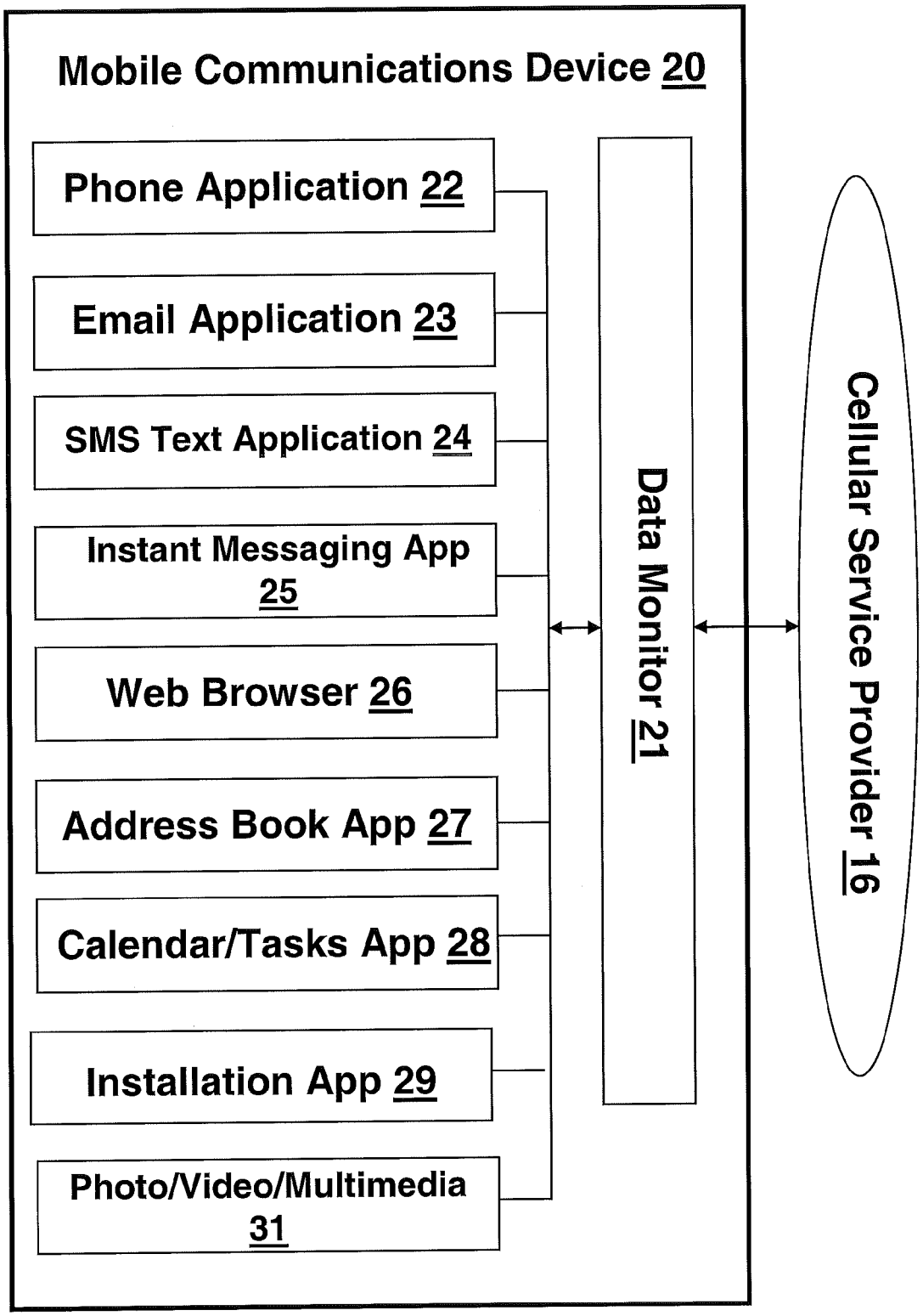
FIG. 2 is a block diagram of a system including a monitoring tool associated with a mobile communications device in accordance with an embodiment of the present invention.

FIG. 2 illustrates in more detail a Data Monitor 21 program tool which captures the data service activity on a Mobile Communications Device 20 in accordance with an embodiment of the present invention. For example, data monitor 21 program tool may be an exemplary representation of data monitor 11, 13, or 15 and similarly mobile communications device 20 may be an exemplary representation of device 10, 12, or 14. Each Mobile Communications Device 20 contains one or more applications that may use a communication protocol (e.g., a conventional communication protocol) to send or receive information (e.g., digital data packets or other forms of communications) or provide supporting applications to facilitate the communications process (e.g., an Address Book which contains an email address used to send an email communication).

In accordance with an embodiment of the present invention, these communication applications and their supporting applications may be referred to as a data service. These data services may include one or more of a Phone Application 22 for sending or receiving voice communications, an Email Application 23 for sending or receiving email communications, a SMS Text Application 24 for sending or receiving SMS text messages, an Instant Messaging Application 25 for sending or receiving instant messages, a Web Browser Application 26 for sending or receiving HTTP requests and responses, an Address Book Application 27 for storing contact information, a Calendar/Task Application 28 for storing appointment information, an Installation Application 29 for storing information regarding the installed applications on the device, and/or a Photo/Video/Multimedia Application 31 for sending or receiving multimedia files.

As described in more detail below, Data Monitor 21 program tool monitors the inbound and outbound activity for each of these data services and sends a detailed log of these activities to a central repository using Cellular Service Provider 16. Alternatively, Data Monitor 21 program tool may send the activity information through any available communications network, such as for example the Internet, a company network, and/or a public cellular network.

As would be understood by one skilled in the art, embodiments of the present invention provide certain advantages over conventional approaches. For example, a conventional approach may simply provide parental controls which monitor and block Internet and email access from a desktop and which primarily prevent access to unwanted content or block the transmission of personally identifiable information. Blocking usually results in the child finding an unmonitored computer to access the blocked content. For example, most gaming consoles today are enabled with Internet access and do not inherently include parental controls. Parental control applications generally do not log the blocked content and none pro-actively notify the parent or administrative user of the event. Additionally, none are capable of monitoring a cell phone or other mobile communications device which today have comparable communication capabilities as a desktop computer.

As another example of a conventional approach, child and employee monitoring of geographic location may be provided from a cell phone, but this approach typically requires an active search by the parent or manager to locate the device. Perimeter boundaries or virtual fencing could be deployed using existing location technology, but again all of these location approaches are after-the-fact of direct contact with a predator or after a potentially life threatening event is in progress.

In contrast in accordance with one or more embodiments of the present invention, systems and methods are disclosed for example to detect the potentially life threatening event before physical contact is made with the user of a monitored wireless device. As an example, Mobile Communications Device 20 may include a GPS-based or other type of location-determination application (e.g., as part of phone application 22 or Data Monitor 21) that periodically or continuously determines the location of Mobile Communications Device 20, with this location information provided to Data Center 17 (e.g., stored in Activity Log 40) via Data Monitor 21 with an optional alert provided to an administrator (e.g., parent) based on location parameter settings (e.g., virtual fence). For example, the GPS information may be provided by Data Monitor 21 to Data Center 17, where it is stored in activity log 40, and an alert provided to the administrator if the Mobile Communications Device 20 enters a restricted area or proceeds outside of a defined geographic region. In general, Data Monitor 21 provides various information to Data Center 17 to permit an administrator (e.g., parent or manager) to monitor the activities (e.g., location, communications with a third party, and/or changes to applications or other data within Mobile Communications Device 20) of a user of Mobile Communications Device 20, with an optional alert provided to the administrator if an unauthorized activity occurs.

Figure 3A:
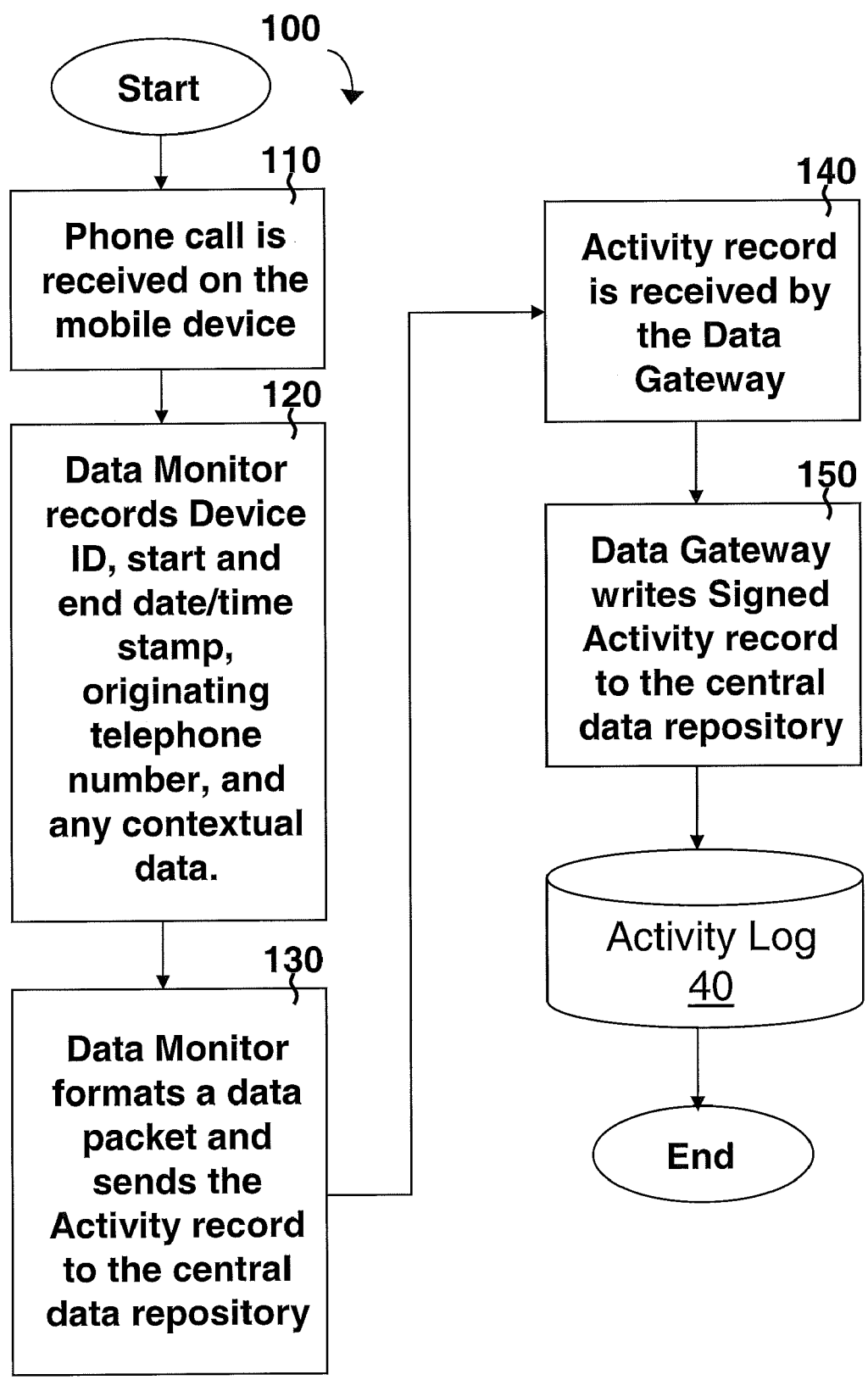
FIGS. 3A-3O illustrate exemplary flowcharts of the monitoring and collecting (logging) of event activity in FIG. 1 for each of the data services of FIG. 2 in accordance with one or more embodiments of the present invention.

For example, FIG. 3A illustrates a data flowchart for the capturing of an inbound voice call using Phone Application 22 on Mobile Communications Device 20 in accordance with an embodiment of the present invention. Initially, in step 110, a phone call is received on Mobile Communications Device 20. In step 120, Data Monitor 21 recognizes that Phone Application 22 data service has been initiated and begins to capture information regarding the use of the data service including, for example, the unique Device ID of the Mobile Communications Device 20, the start and end date/time stamp of the call, the originating phone number, and/or any contextual data. Once the call has been terminated (step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 to Activity Log 40, a central repository for all data collected from Mobile Communications Device 20.

Data gateway 30 may optionally write the data packet(s) in step 150 in a signed (e.g., digitally signed) fashion to activity log 40, in accordance with an embodiment of the present invention. For example, the activity record may be signed to identify (e.g., authenticate) the information and provide a chain of custody and authenticity for the stored information (e.g., for custody of evidence or other documentation requirements), as would be understood by one skilled in the art. Furthermore as a specific example, Data Gateway 30 may provide encryption and decryption processing for information related to the activity record and/or additional information, such as through the use of any one of several private or public key encryption or signature algorithms including the RSA algorithm (by RSA Security of Bedford, Mass.), the Digital Encryption Standard (DES), the Advanced Encryption Standard (AES), and broad families of signature or hash algorithms such as the Secure Hash Algorithm (SHA) and the Message Digest (MD) algorithm.

In general depending upon the level of security desired and the specific requirements or applications, the activity record may not have to be encrypted. For example, by not encrypting the activity record, considerable savings may be achieved in terms of processing, power savings, time, and/or memory. Thus, the activity record may be securely recorded and validated by generating an associated signature that can be verified. Consequently, the activity record is viewable and useable in a conventional fashion, but is also verifiable through the signature (e.g., for chain of custody or other evidentiary purposes), as would be understood by one skilled in the art.

Figure 3B:
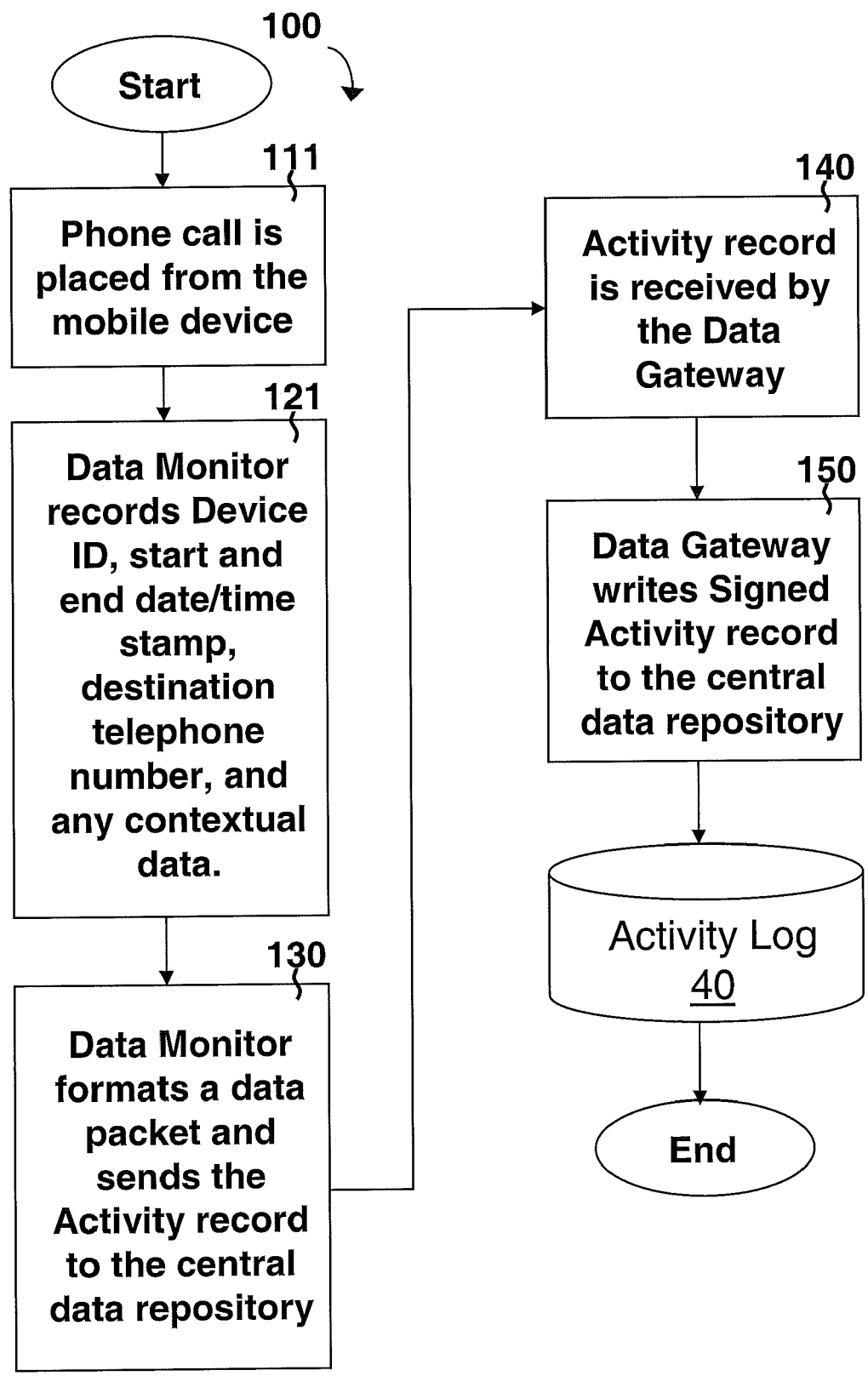

FIG. 3B illustrates a data flowchart for the capturing of an outbound voice call using Phone Application 22 on Mobile Communications Device 20 in accordance with an embodiment of the present invention. Initially, in step 111, a phone call is placed from Mobile Communications Device 20. In step 121, Data Monitor 21 recognizes that Phone Application 22 data service has been initiated and begins to capture information regarding the use of the data service including, for example, the unique Device ID of Mobile Communications Device 20, the start and end date/time stamp of the call, the destination phone number, and/or any contextual data. Once the call has been terminated (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3*a*) to Activity Log 40, a central repository for all data collected from Mobile Communications Device 20.

Figure 3C:
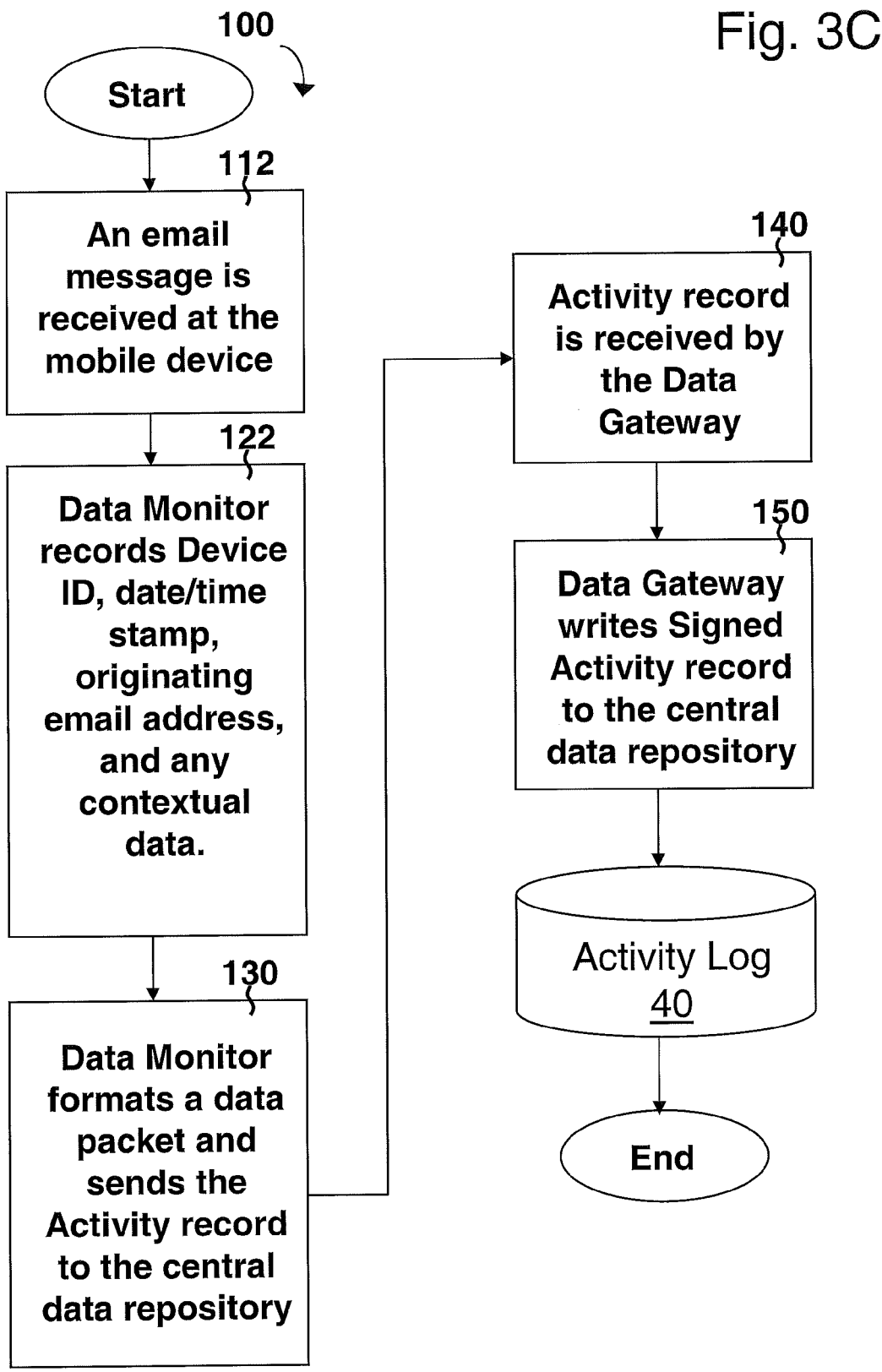

FIG. 3C illustrates a data flowchart for the capturing of an inbound email message using Email Application 23 on Mobile Communications Device 20 in accordance with an embodiment of the present invention. Initially, in step 112, an email message is received on Mobile Communications Device 20. In step 122, Data Monitor 21 recognizes that Email Application 23 data service has been initiated and begins to capture information regarding the use of the data service including, for example, the unique Device ID of Mobile Communications Device 20, the date/time stamp of the message, the originating email address, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in the Data Center 17 receives the data packet(s) and then writes the data packet(s) in step 150 (e.g., optionally in a signed and/or encrypted fashion as discussed in reference to FIG. 3*a*) to Activity Log 40, a central repository for all data collected from Mobile Communications Device 20.

Figure 3D:
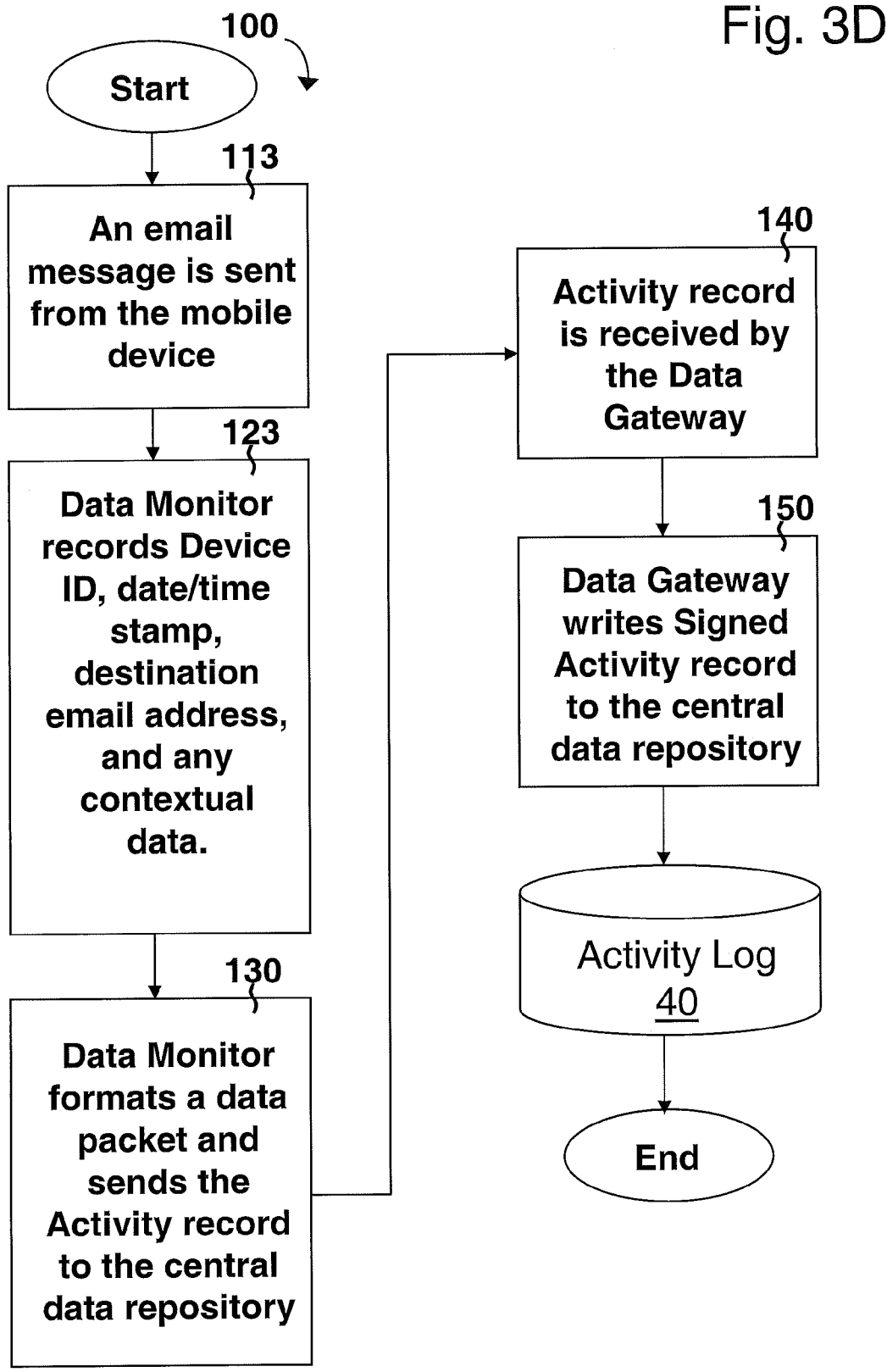

FIG. 3D illustrates a data flowchart for the capturing of an outbound email message using Email Application 23 on Mobile Communications Device 20 in accordance with an embodiment of the present invention. Initially, in step 113, an email message is sent from Mobile Communications Device 20. In step 123, the Data Monitor 21 recognizes that Email Application 23 data service has been initiated and begins to capture information regarding the use of the data service including, for example, the unique Device ID of Mobile Communications Device 20, the date/time stamp of the message, the destination email address, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3E:
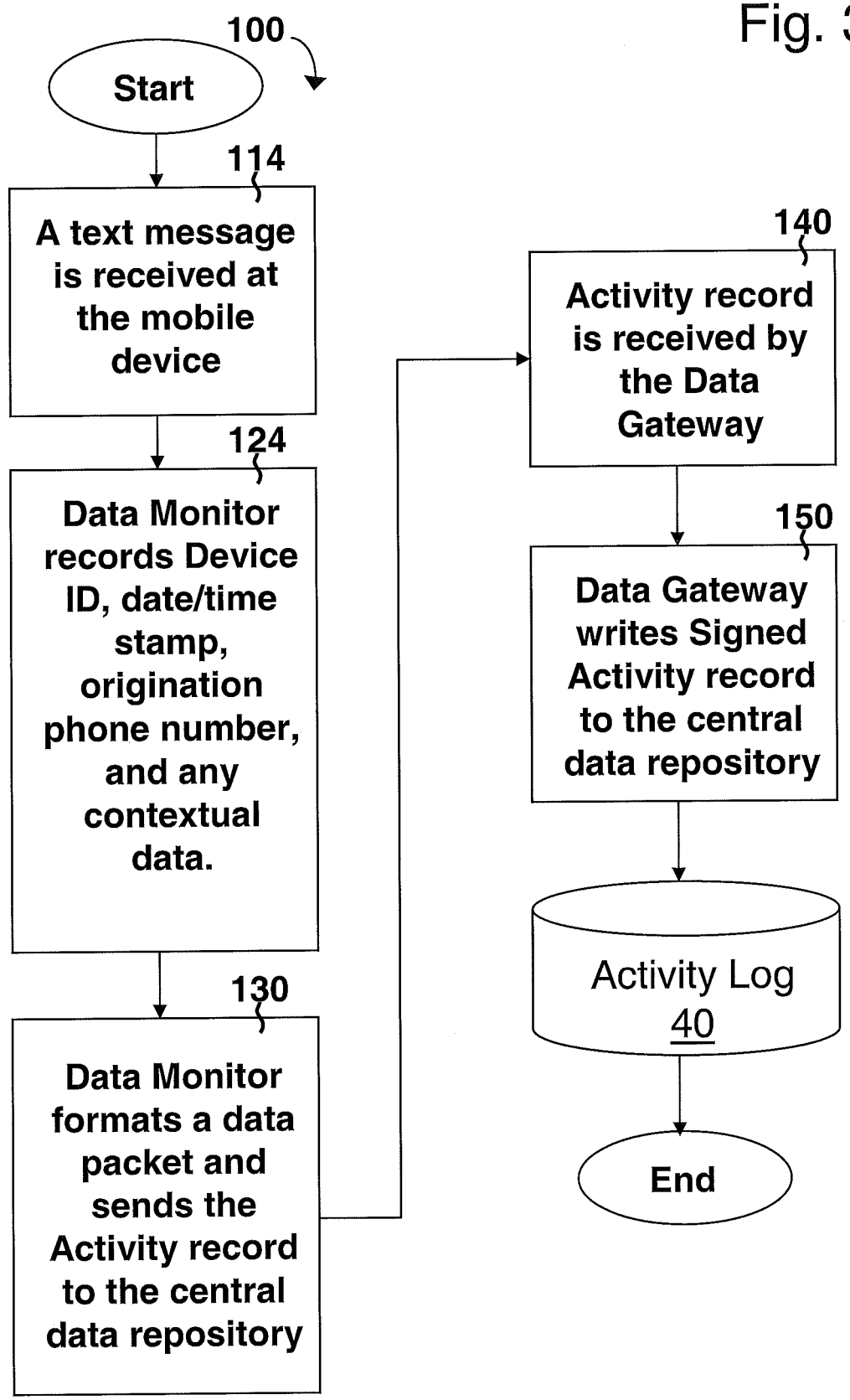

FIG. 3E illustrates a data flowchart for the capturing of an inbound text message using SMS Text Application 24 on Mobile Communications Device 20 in accordance with an embodiment of the present invention. Initially, in step 114, a text message is received on Mobile Communications Device 20. In step 124, Data Monitor 21 recognizes that the SMS Text Application 24 data service has been initiated and begins to capture information regarding the use of the data service including, for example, the unique Device ID of Mobile Communications Device 20, the date/time stamp of the message, the originating phone number, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3F:
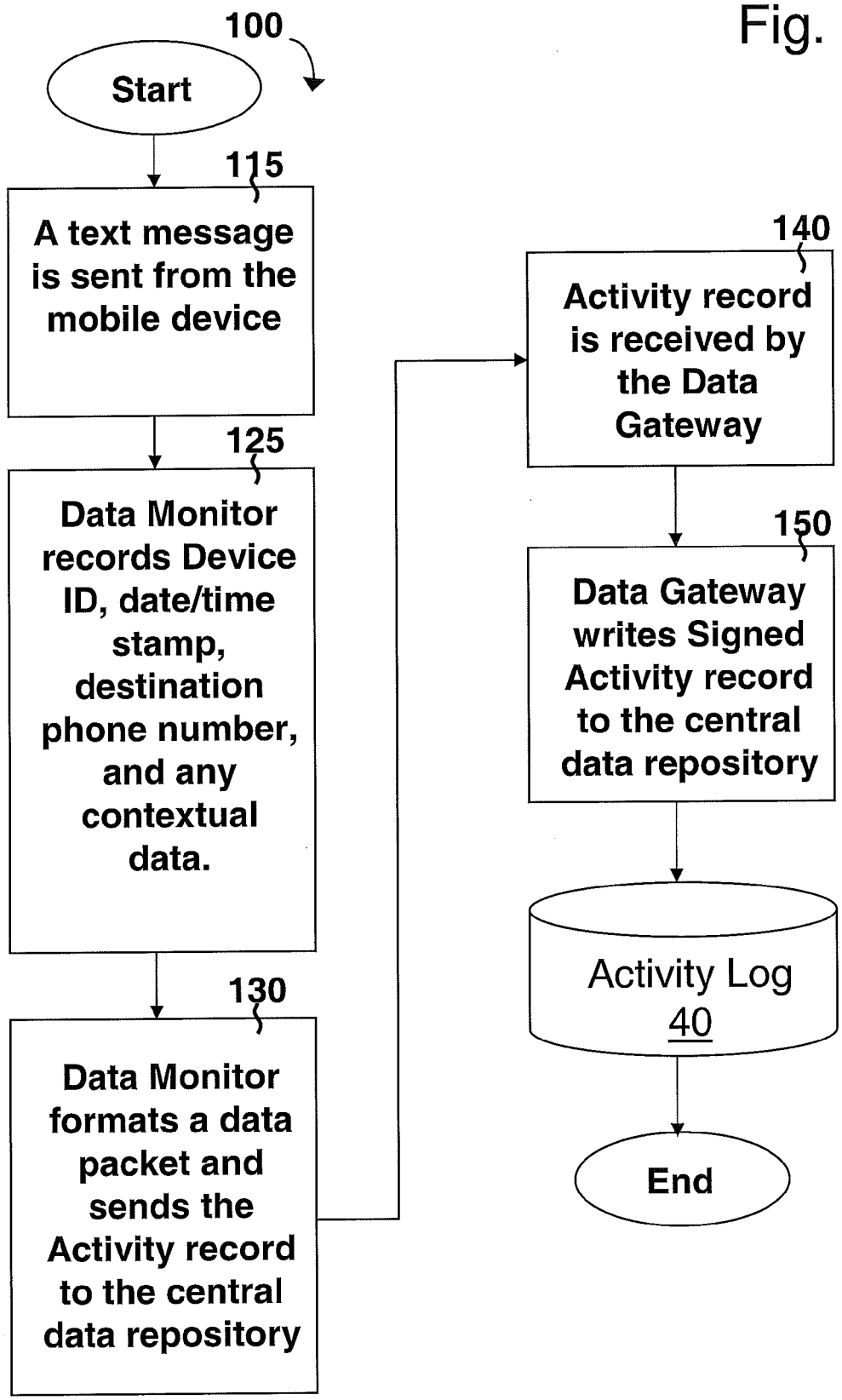

FIG. 3F illustrates a data flowchart for the capturing of an outbound text message using SMS Text Application 24 on Mobile Communications Device 20 in accordance with an embodiment of the present invention. Initially, in step 115, a text message is sent from Mobile Communications Device 20. In step 125, Data Monitor 21 recognizes that SMS Text Application 24 data service has been initiated and begins to capture information regarding the use of the data service including, for example, the unique Device ID of Mobile Communications Device 20, the date/time stamp of the message, the destination phone number, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3G:
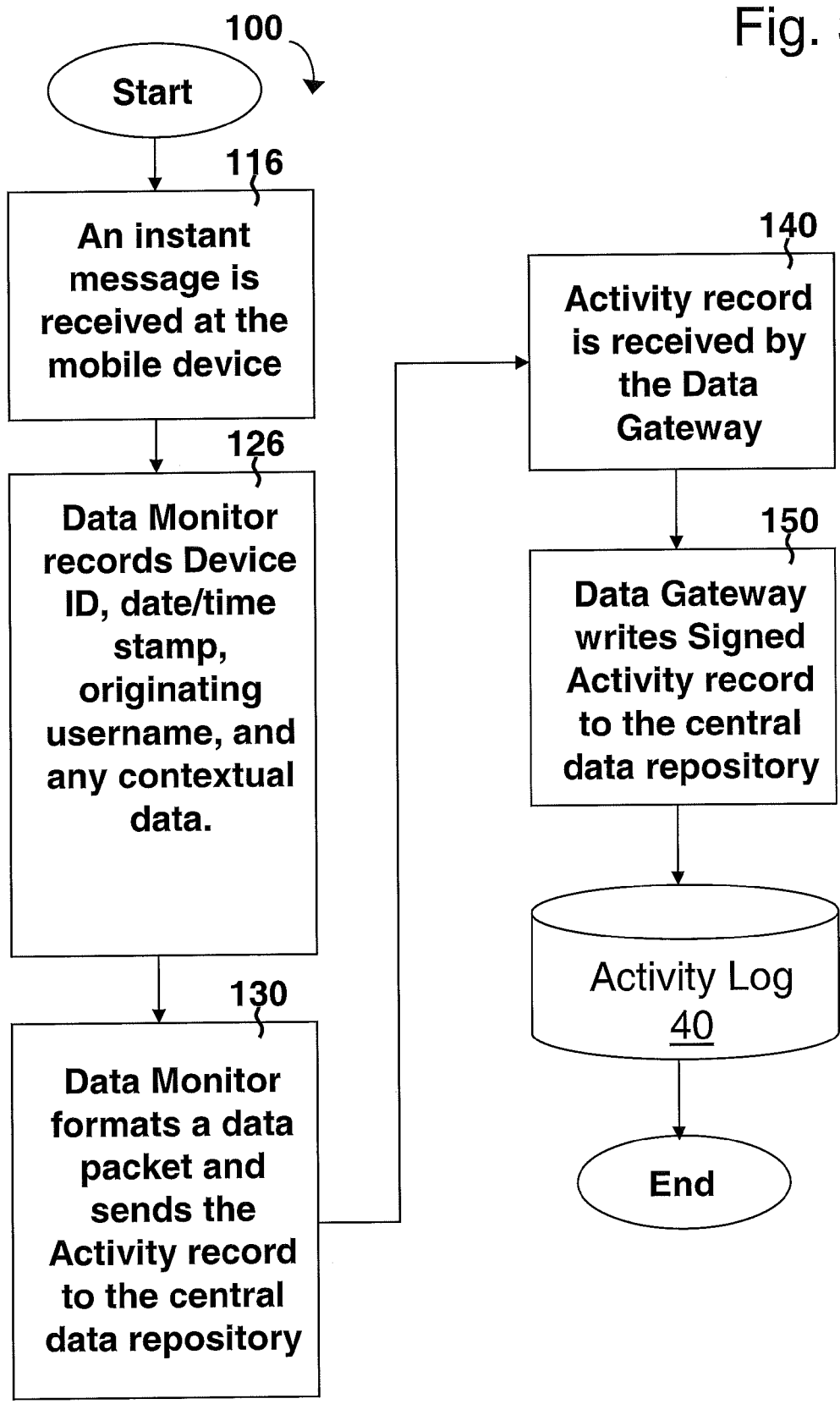

FIG. 3G illustrates a data flowchart for the capturing of an inbound instant message using Instant Messaging Application 25 on Mobile Communications Device 20 in accordance with an embodiment of the present invention. Initially, in step 116, an instant message is received on Mobile Communications Device 20. In step 126, Data Monitor 21 recognizes that Instant Messaging Application 25 data service has been initiated and begins to capture information regarding the use of the data service including, for example, the unique Device ID of Mobile Communications Device 20, the date/time stamp of the message, the originating username, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3H:
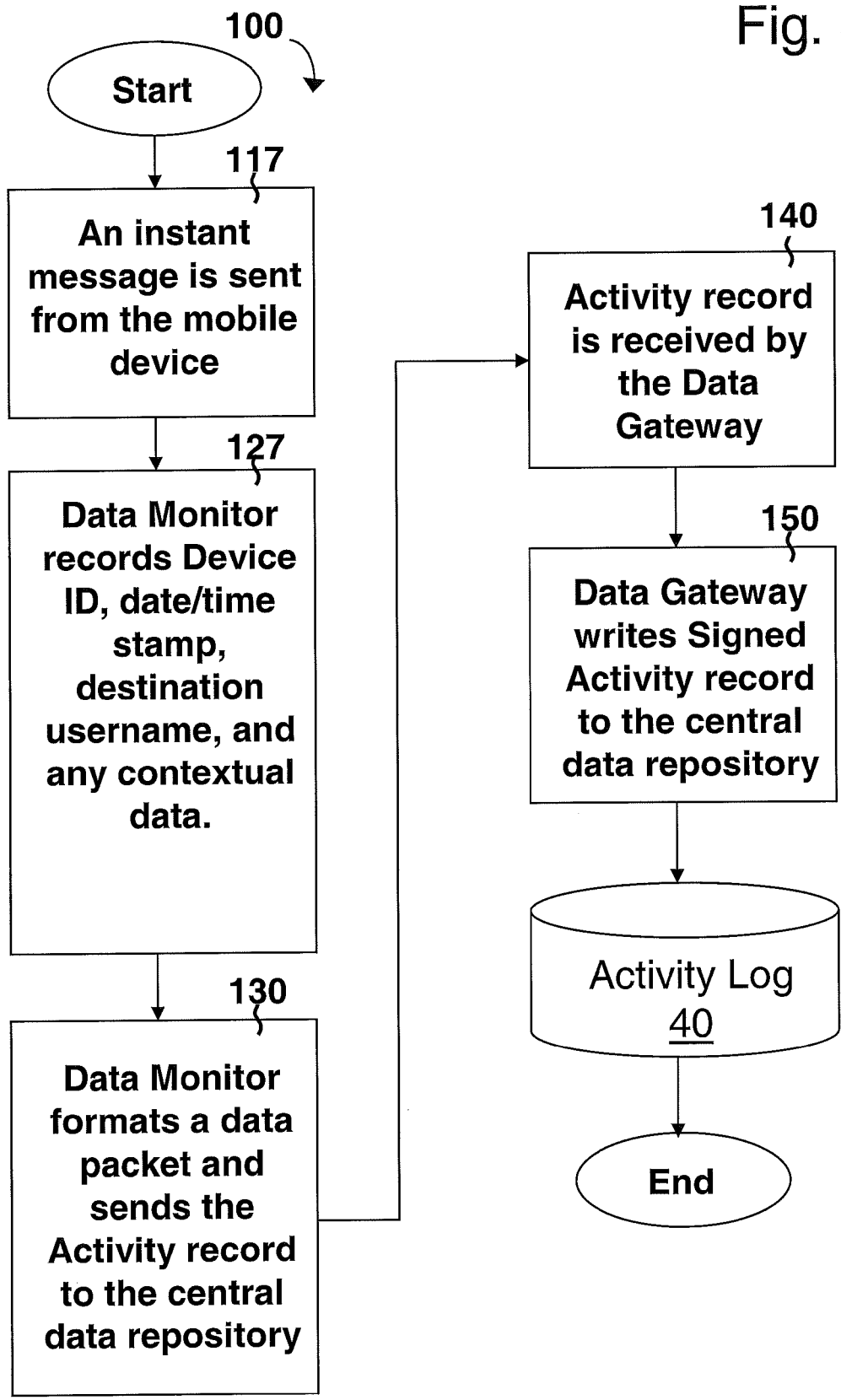

FIG. 3H illustrates a data flowchart for the capturing of an outbound instant message using Instant Messaging Application 25 on Mobile Communications Device 20 in accordance with an embodiment of the present invention. Initially, in step 117, an instant message is sent from Mobile Communications Device 20. In step 127, Data Monitor 21 recognizes that Instant Messaging Application 25 data service has been initiated and begins to capture information regarding the use of the data service including the unique Device ID of Mobile Communications Device 20, the date/time stamp of the message, the destination username, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

FIG. 3I illustrates a data flowchart for the capturing of an HTTP (Internet) request using Web Browser Application 26 on Mobile Communications Device 20 in accordance with an embodiment of the present invention. Initially, in step 118, an HTTP request is sent from Mobile Communications Device 20. In step 128, Data Monitor 21 recognizes that Web Browser Application 26 data service has been initiated and begins to capture information regarding the use of the data service including, for example, the unique Device ID of Mobile Communications Device 20, the date/time stamp of the request, the destination URL, and/or any contextual data. Once the request has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3L:
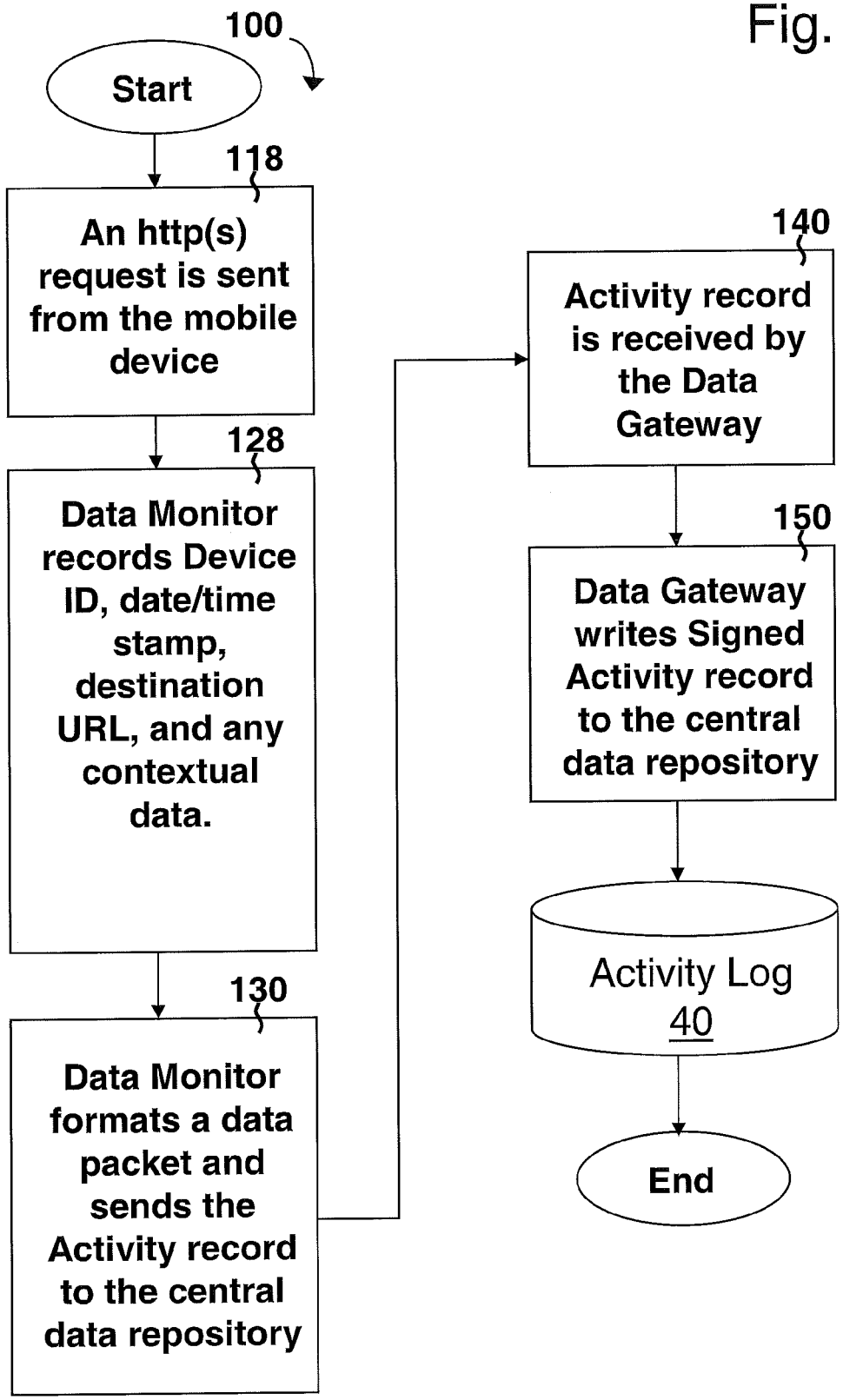
Figure 3J:
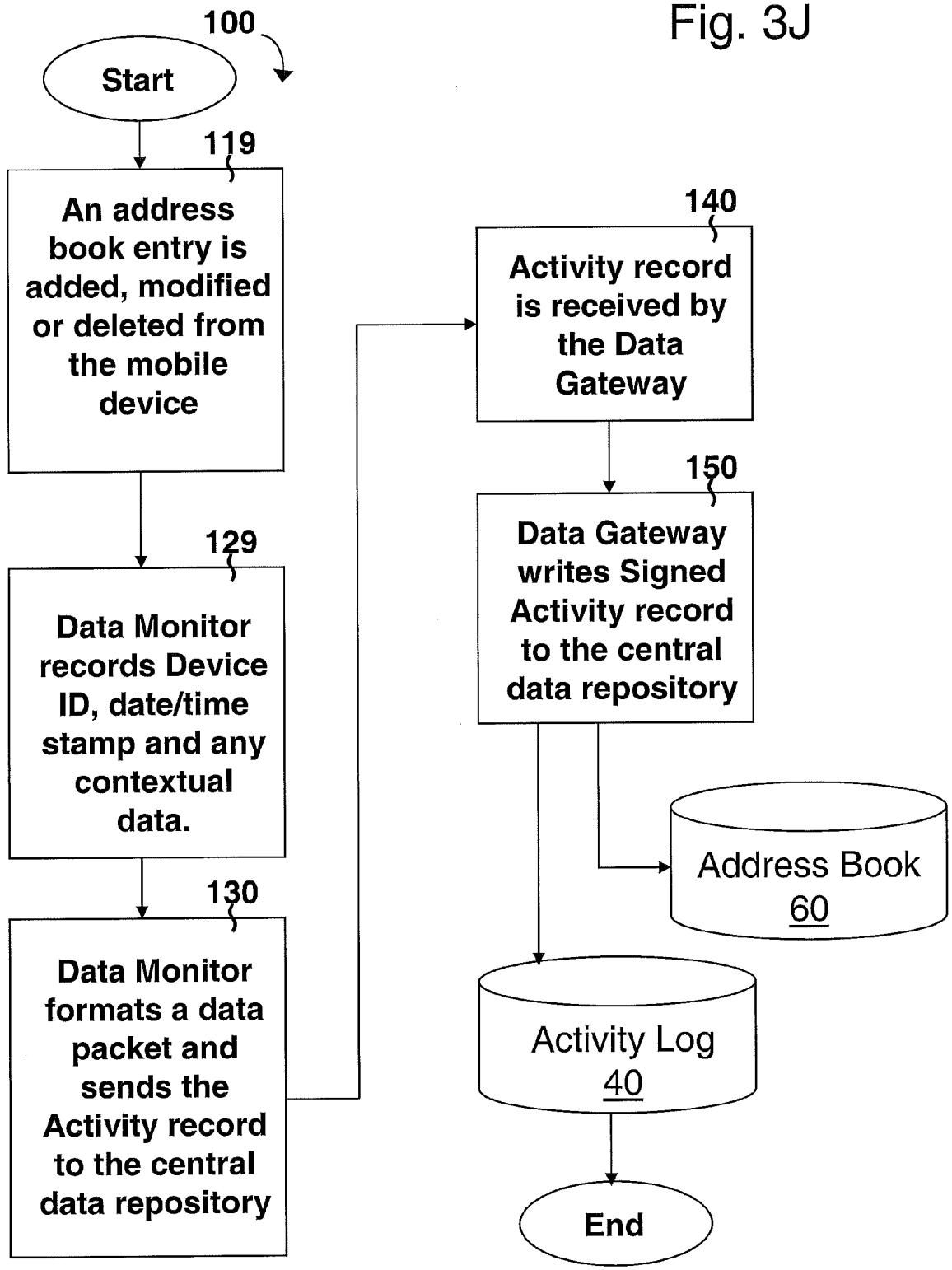

FIG. 3J illustrates a data flowchart for the capturing of a change to the address book using Address Book Application 27 on Mobile Communications Device 20 in accordance with an embodiment of the present invention. Initially, in step 119, an add, modify, or delete address book transaction is initiated on Mobile Communications Device 20. In step 129, Data Monitor 21 recognizes that Address Book Application 27 data service has been initiated and begins to capture information regarding the use of the data service including, for example, the unique Device ID of Mobile Communications Device 20, the date/time stamp of the change, and/or any contextual information such as the phone number or name that was changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20, and to Address Book 60, a central repository backup for all address book records residing on Mobile Communications Device 20.

Figure 3K:
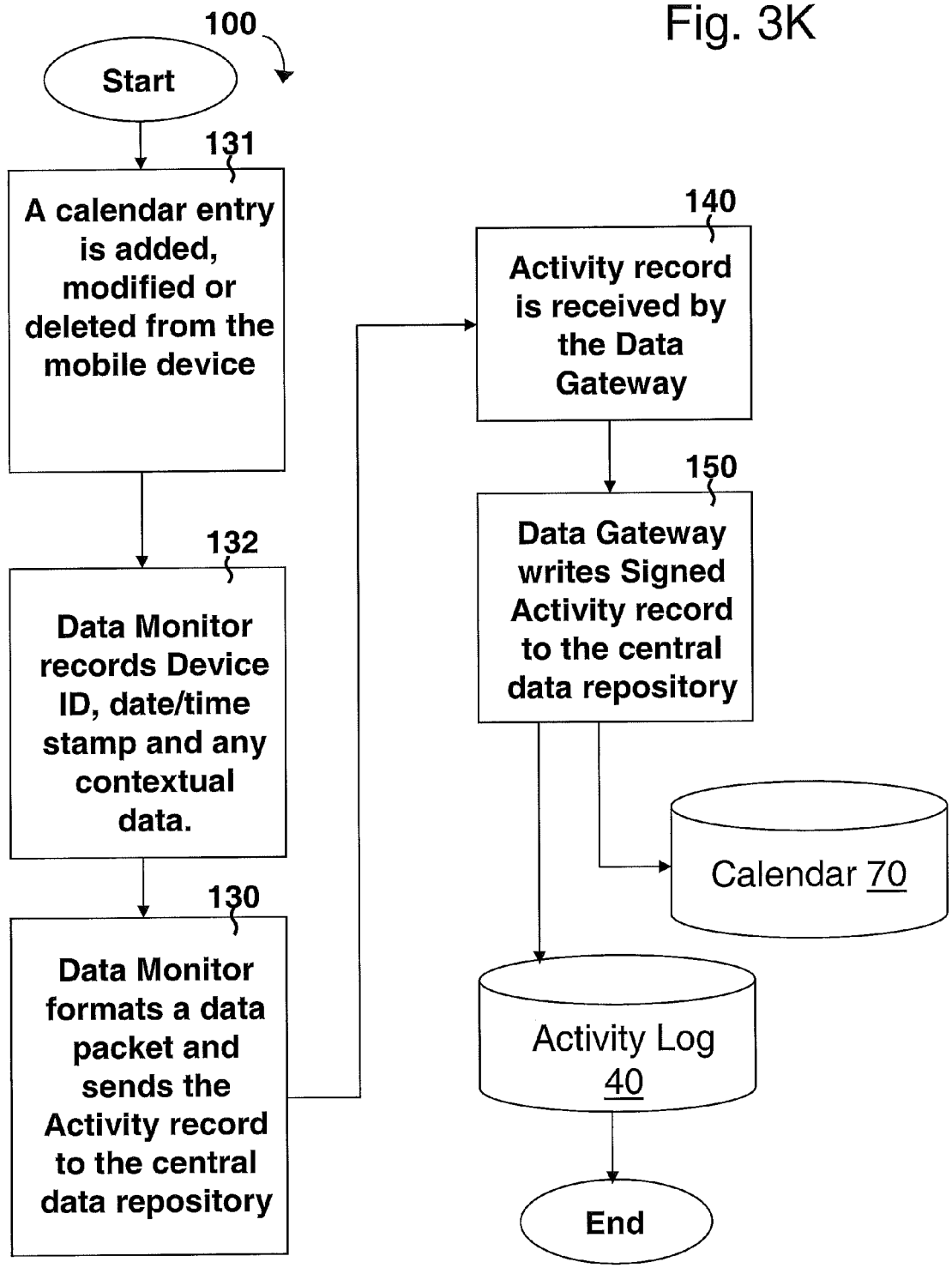
Figure 3L:
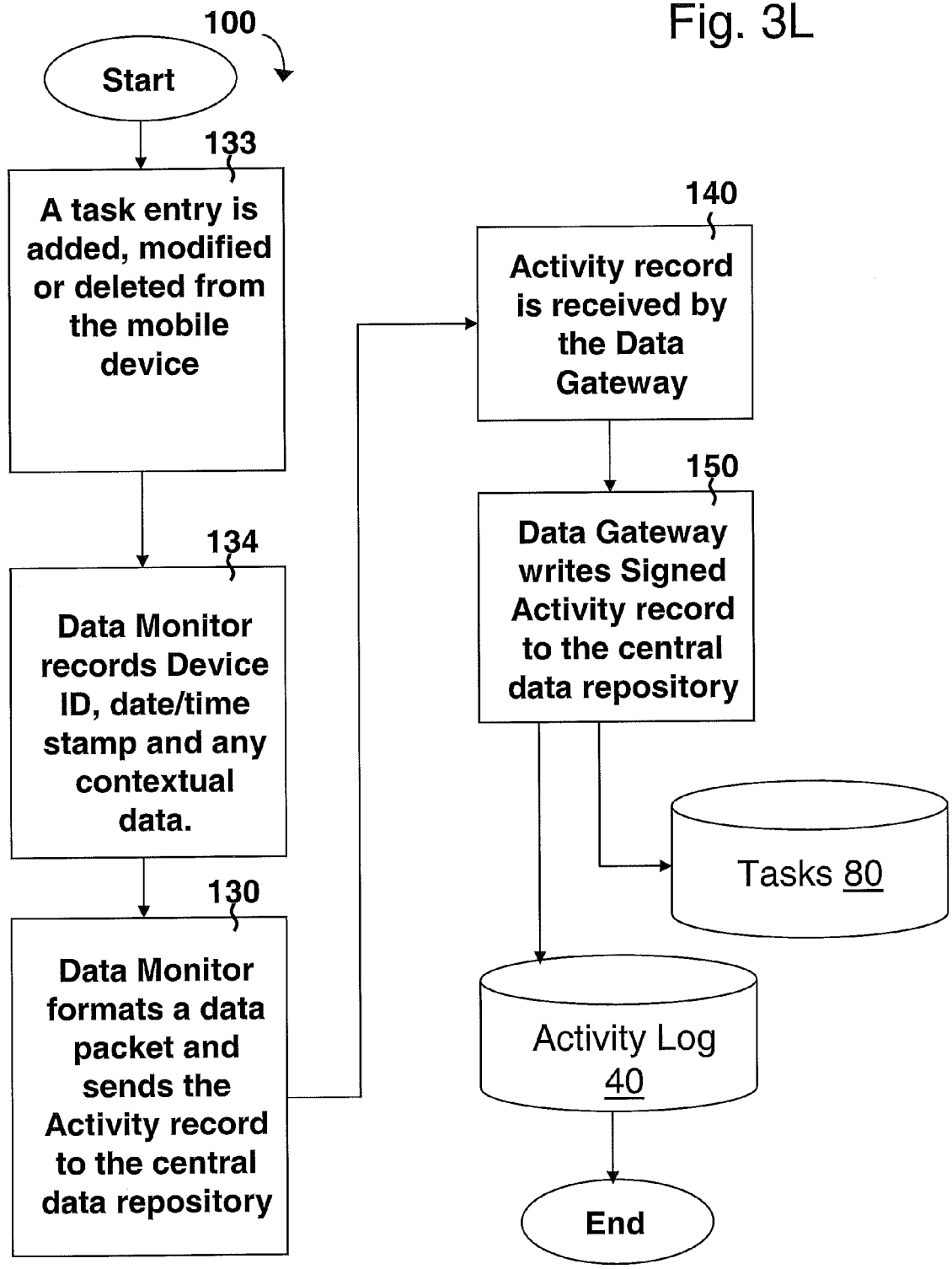

FIG. 3K illustrates a data flowchart for the capturing of a change to the calendar using Calendar/Task Application 28 on Mobile Communications Device 20 in accordance with an embodiment of the present invention. Initially, in step 131, an add, modify, or delete calendar transaction is initiated on Mobile Communications Device 20. In step 132, Data Monitor 21 recognizes that Calendar/Task Application 28 data service has been initiated and begins to capture information regarding the use of the data service including, for example, the unique Device ID of Mobile Communications Device 20, the date/time stamp of the change, and/or any contextual information such as the date or meeting location that was changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20, and to Calendar 70, a central repository backup for all calendar records residing on Mobile Communications Device 20.

FIG. 3L illustrates a data flowchart for the capturing of a change to the task list using Calendar/Task Application 28 on Mobile Communications Device 20 in accordance with an embodiment of the present invention. Initially, in step 133, an add, modify, or delete task transaction is initiated on Mobile Communications Device 20. In step 134, Data Monitor 21 recognizes that Calendar/Task Application 28 data service has been initiated and begins to capture information regarding the use of the data service including, for example, the unique Device ID of Mobile Communications Device 20, the date/time stamp of the change, and/or any contextual information such as the date or task details that were changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20, and to Tasks 80, a central repository backup for all task records residing on Mobile Communications Device 20.

Figure 3M:
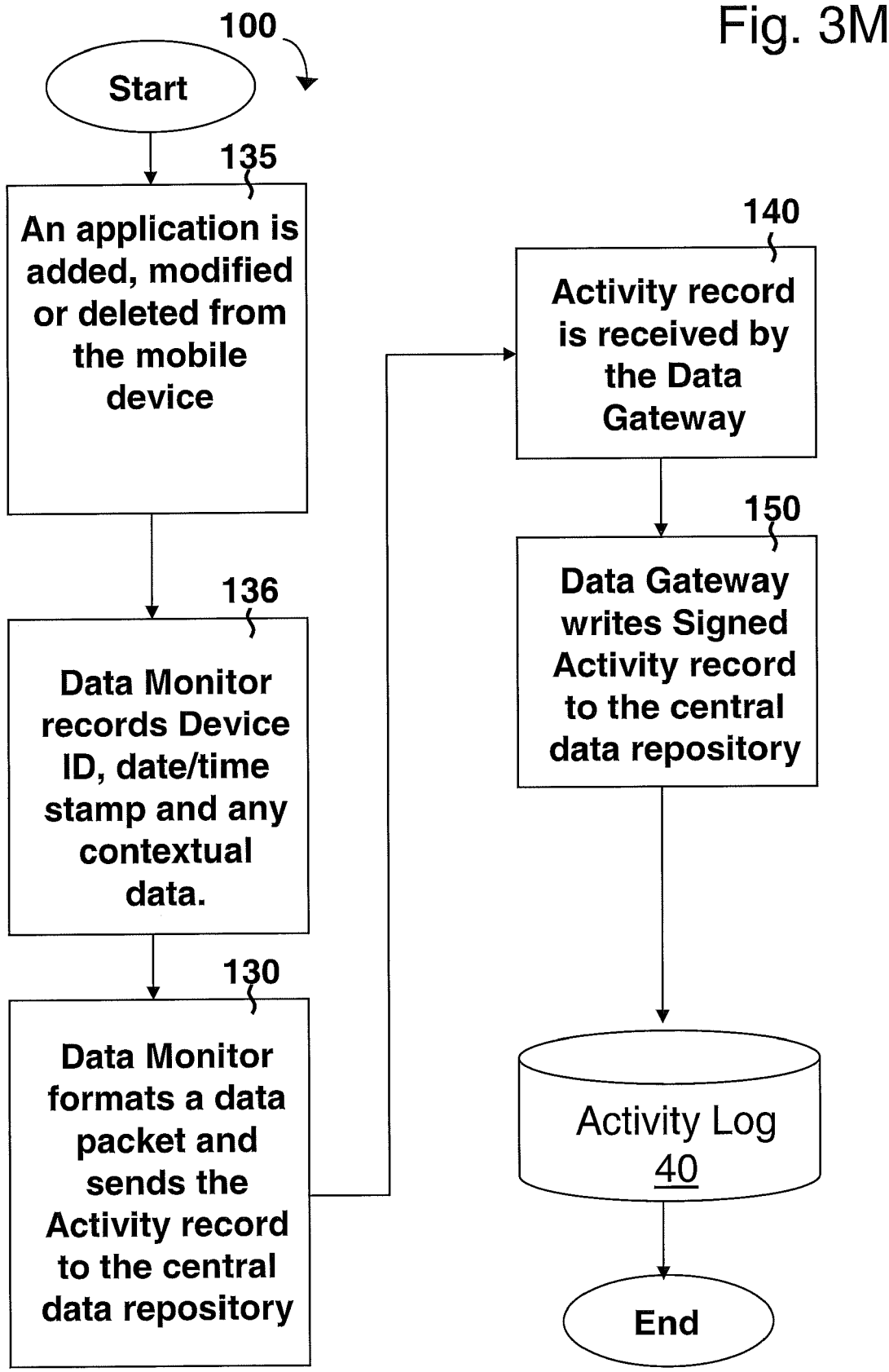

FIG. 3M illustrates a data flowchart for the capturing of a change to the list of installed applications on Mobile Communications Device 20 using Installation Application 29 on Mobile Communications Device 20 in accordance with an embodiment of the present invention. Initially, in step 135, an add, modify, or delete of an application is initiated on Mobile Communications Device 20. In step 136, Data Monitor 21 recognizes that Installation Application 29 data service has been initiated and begins to capture information regarding the use of the data service including the unique Device ID of Mobile Communications Device 20, the date/time stamp of the change, and/or any contextual information such as the name of the application(s) that were changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3N:
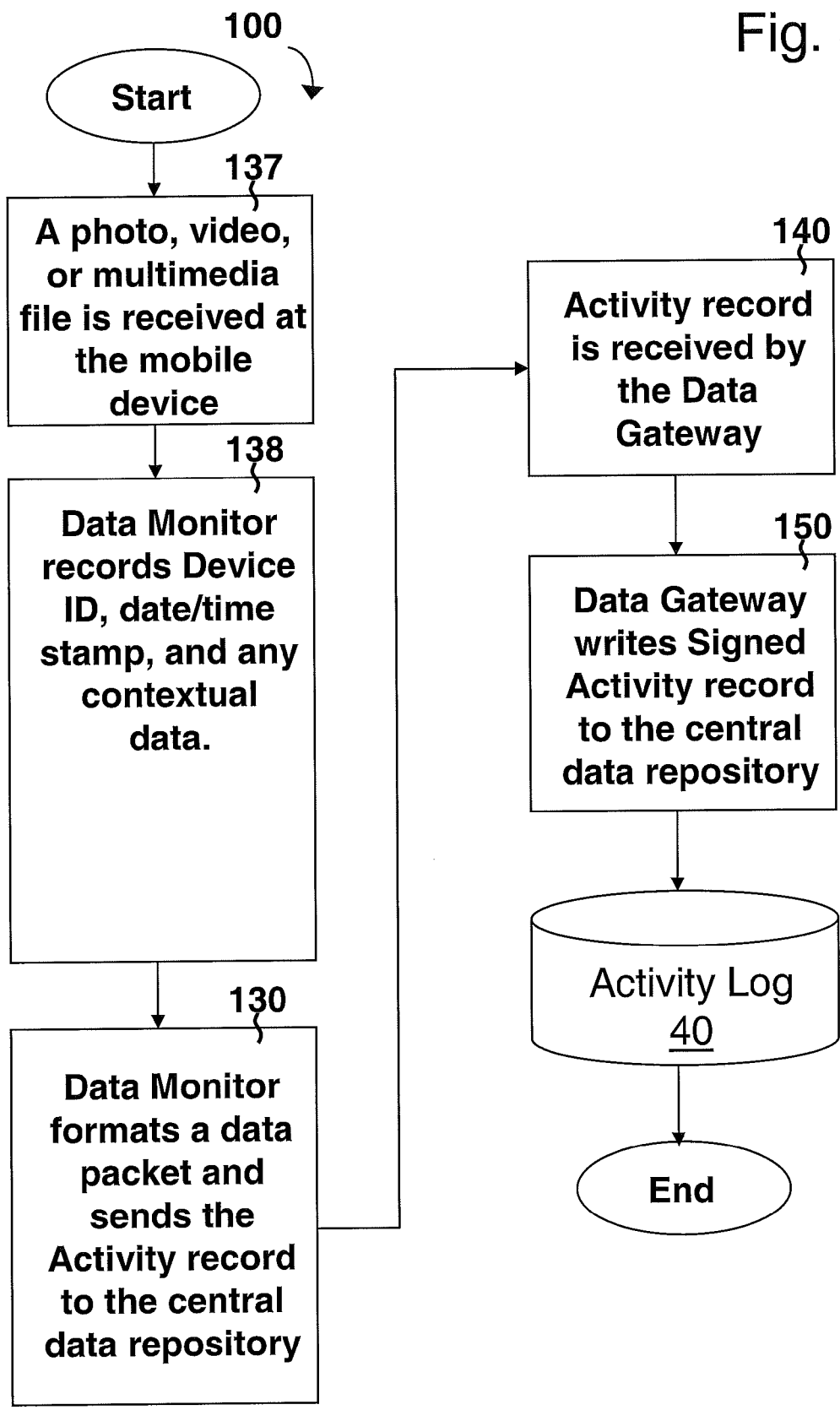

FIG. 3N illustrates a data flowchart for the capturing of an inbound photo, video, or other multimedia file using Photo/Video/Multimedia Application 31 on Mobile Communications Device 20 in accordance with an embodiment of the present invention. Initially, in step 137, a multimedia file is received on Mobile Communications Device 20. In step 138, Data Monitor 21 recognizes that the Photo/Video/Multimedia Application 31 data service has been initiated and begins to capture information regarding the use of the data service including, for example, the unique Device ID of Mobile Communications Device 20, the date/time stamp of the file transfer, and/or any contextual information contained in the file. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3O:
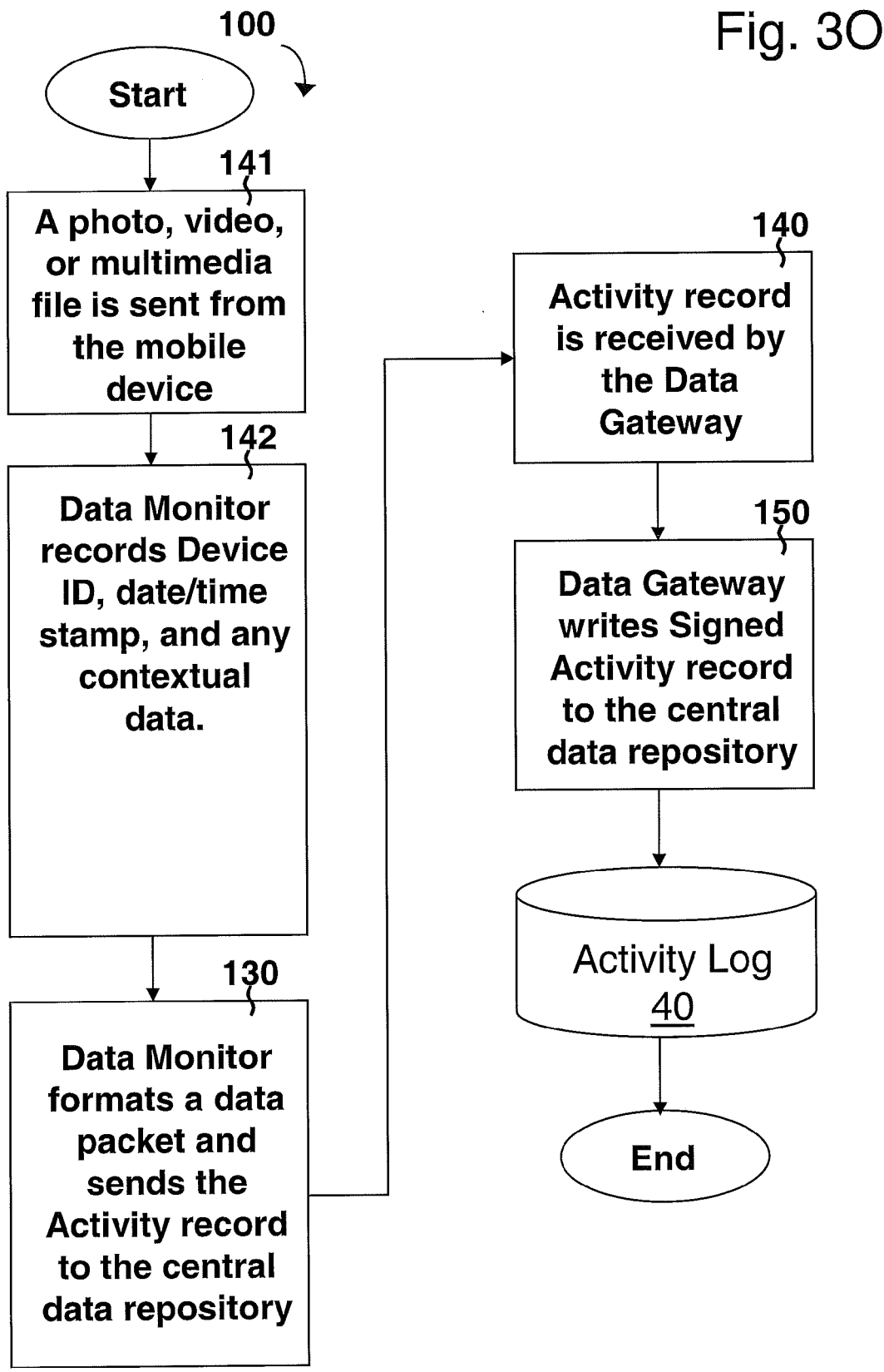

FIG. 3O illustrates a data flowchart for the capturing of an outbound photo, video, or other multimedia file using Photo/Video/Multimedia Application 31 on Mobile Communications Device 20 in accordance with an embodiment of the present invention. Initially, in step 141, a multimedia file is sent from Mobile Communications Device 20. In step 142, Data Monitor 21 recognizes that Photo/Video/Multimedia Application 31 data service has been initiated and begins to capture information regarding the use of the data service including, for example, the unique Device ID of Mobile Communications Device 20, the date/time stamp of the file transfer, and/or any contextual information contained in the file. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

One aspect of the monitoring capabilities in accordance with one or more embodiments of the present invention is the ability for the application to successfully log the activity that is occurring on Mobile Communications Device 20 into a centrally located Activity Log 40. An exemplary structure for Activity Log 40 database is shown in tabular form in FIGS. 4A and 4B in accordance with an embodiment of the present invention.

The first column identifies a unique key (record ID) that is automatically assigned to each row of the database. This is followed by a unique account ID which identifies the account associated with the log record, the data service that was invoked (message type), and whether the communication was inbound (in) or outbound (out) from the Mobile Communications Device 20. The Start Time is a date/time stamp identifying the start of a call or completion of a data service transaction. The End Time is a date/time stamp identifying the completion of a call.

The Caller ID field shows the originating phone number, email address, or username for inbound communications and the destination phone number, email address, or username for outbound communications. The Log field collects contextual information regarding the transaction which can include the contents of an email message, instant message, text message, or any other form of information in accordance with some embodiments, including audio, photo, video, textual data, and/or multimedia information.

The remaining fields found in FIG. 4B are supplemental data elements associated with a data transaction with Mobile Communications Device 20 in accordance with one or more embodiments of the present invention. These data elements are optional and may be implemented and used, for example, for legal proceedings and other supplemental applications. The Long field shows the Longitude of the phone at the time of the transaction, while the Lat field shows the Latitude of the phone at the time of the transaction (e.g., information provided by GPS, cell-based location applications, or network-based location applications as discussed previously herein). The CRC (cyclic redundancy code) field is for the digital signature information of the database record to ensure its authenticity (e.g., as discussed in reference to FIG. 3a), which may be used to provide the CRC checksum or other types of error-detecting code information desired. The Auth field is for the method of authentication used such as biometric, password, no authentication (N/A), etc. The Auth ID field (authorization identification) is for the identity of the person that authorized the transaction. The Carrier Log Auth field (authorization field) is for the record number of the carrier's accounting system, which relates to the transaction (e.g., cell phone carrier or other data communication provider information as discussed in reference to FIG. 1, depending on the type of data communication).

The rules that govern the access to data services on Mobile Communications Device 20 are maintained, for example, in Permissions 50 database. In accordance with an embodiment of the invention, this database would be accessible by the owner of the account using an HTML web interface. An exemplary structure for Permissions 50 database is shown in tabular form in FIG. 5 in accordance with an embodiment of the present invention.

The first column identifies a unique key that is automatically assigned to each row of the database. This is followed by a unique account ID which identifies the account associated with the permission record. The next field lists the data service for which the rules are to be applied, followed by the specific rules as to allow or deny access to that data service on the Mobile Communications Device 20.

As an example, a value of true in the Allow column would allow the use of that data service for any entry found in the address book on the Mobile Communications Device 20, while a value of true in the Deny column would deny the use of that data service for any entry not found in the address book on the Mobile Communications Device 20. As another example, in accordance with an alternate embodiment of the present invention, would be to allow or deny use of the data service based on the contextual content of the message.

The Alert Type and alert number fields identify the corresponding preferred method of alert notification and related contact information (e.g., email address, phone number, etc. to use to provide the alert). Multiple rows in the database for the same Account and Data Service would be used to alert multiple users of an unauthorized event as exemplified in Record ID rows 103 and 104 of FIG. 5 in accordance with an embodiment of the present invention.

Figure 6A:
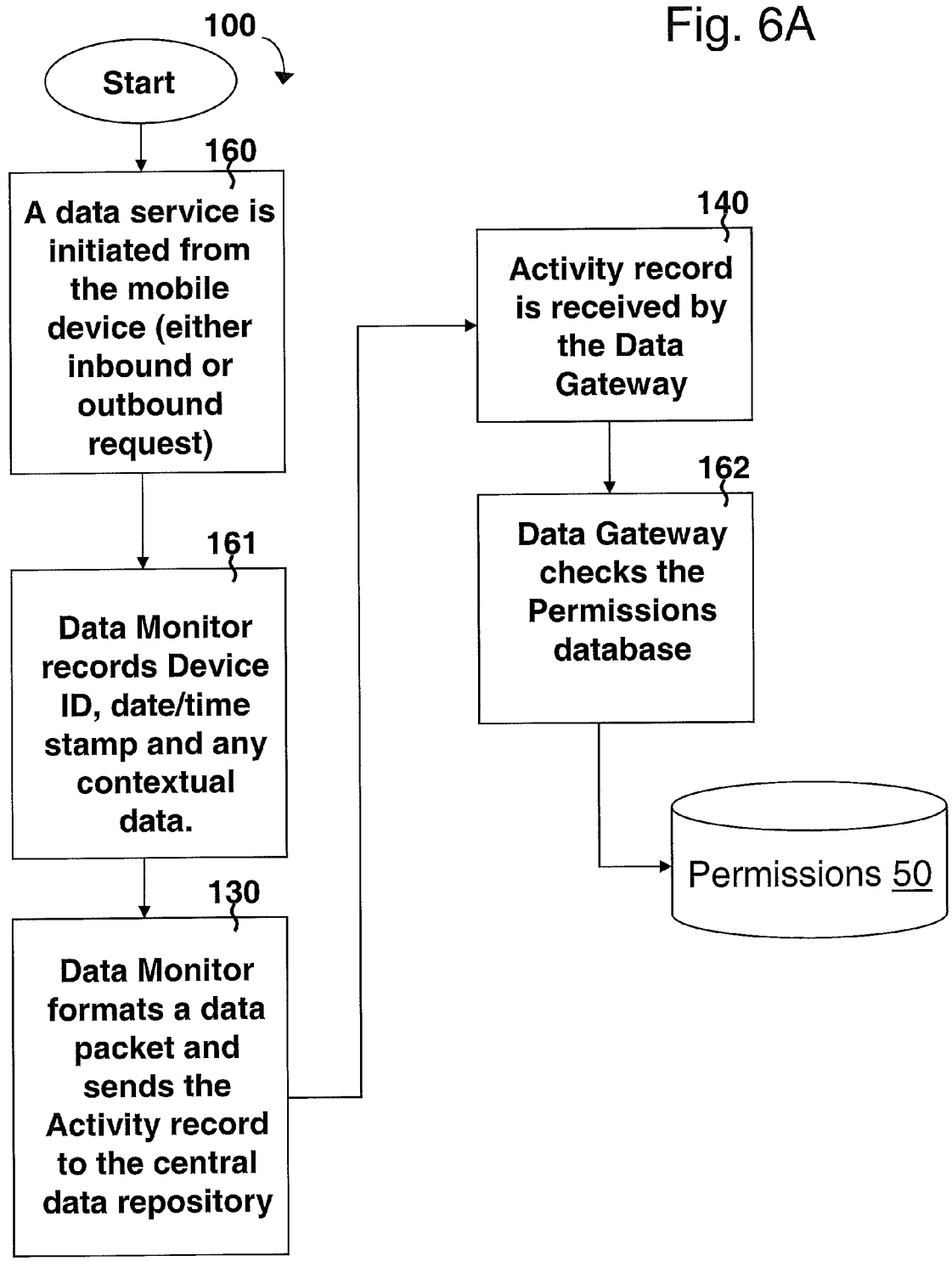
FIGS. 6A-6B illustrate exemplary flowcharts where the data service on a wireless device is processed or blocked based on the contextual information being passed through the data service in accordance with an embodiment of the present invention.
Figure 6B:
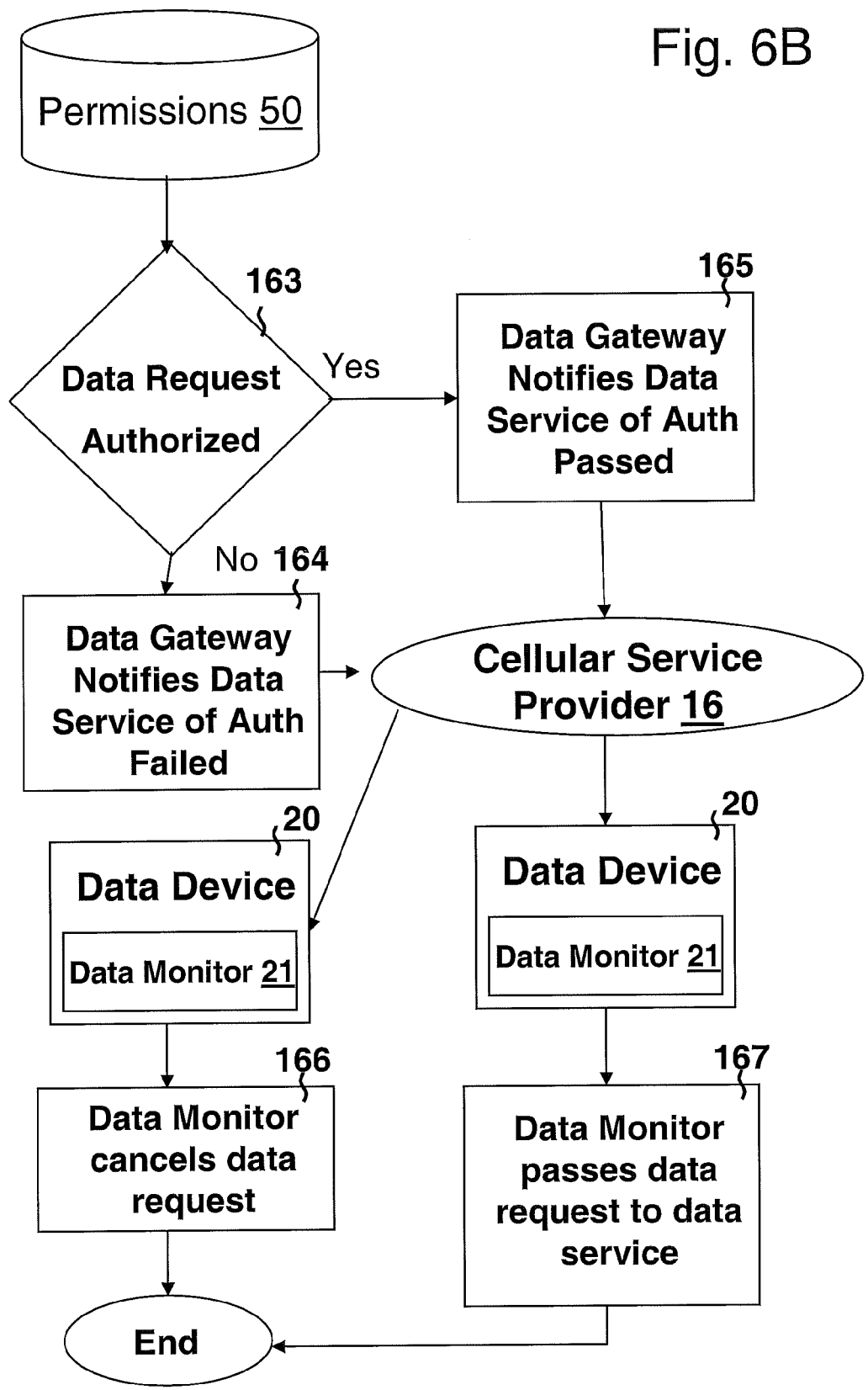

FIGS. 6A and 6B illustrate exemplary data flowcharts in accordance with an alternative embodiment of the invention where the contextual content of the communication is checked against permissions 50 database prior to allowing Mobile Communications Device 20 access to the data services 22 through 29 and 31. Initially, in step 160, one or more data services 22 through 29 and 31 may be initiated on Mobile Communications Device 20. In step 161, Data Monitor 21 recognizes that a data service has been initiated and begins to capture information regarding the use of the data service including, for example, the unique Device ID of Mobile Communications Device 20, the date/time stamp, the originating or destination phone number, email address, or username, and/or the contextual content of the data packet.

Once the request for a data service has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then checks the content of the data packet(s) in step 162 against Permissions 50 database located in Data Center 17. If the data request was not authorized (step 163), Data Gateway 30 notifies (step 164) Mobile Communications Device 20 by sending a message through Cellular Service Provider 16 to Data Monitor 21 on Mobile Communications Device 20. In Step 166, Data Monitor 21 cancels the data service request. If the data request was authorized (step 163), Data Gateway 30 notifies (step 165) Mobile Communications Device 20 by sending a message through Cellular Service Provider 16 to Data Monitor 21 on Mobile Communications Device 20. In Step 167, Data Monitor 21 completes the authorized data service request.

Figure 7A:
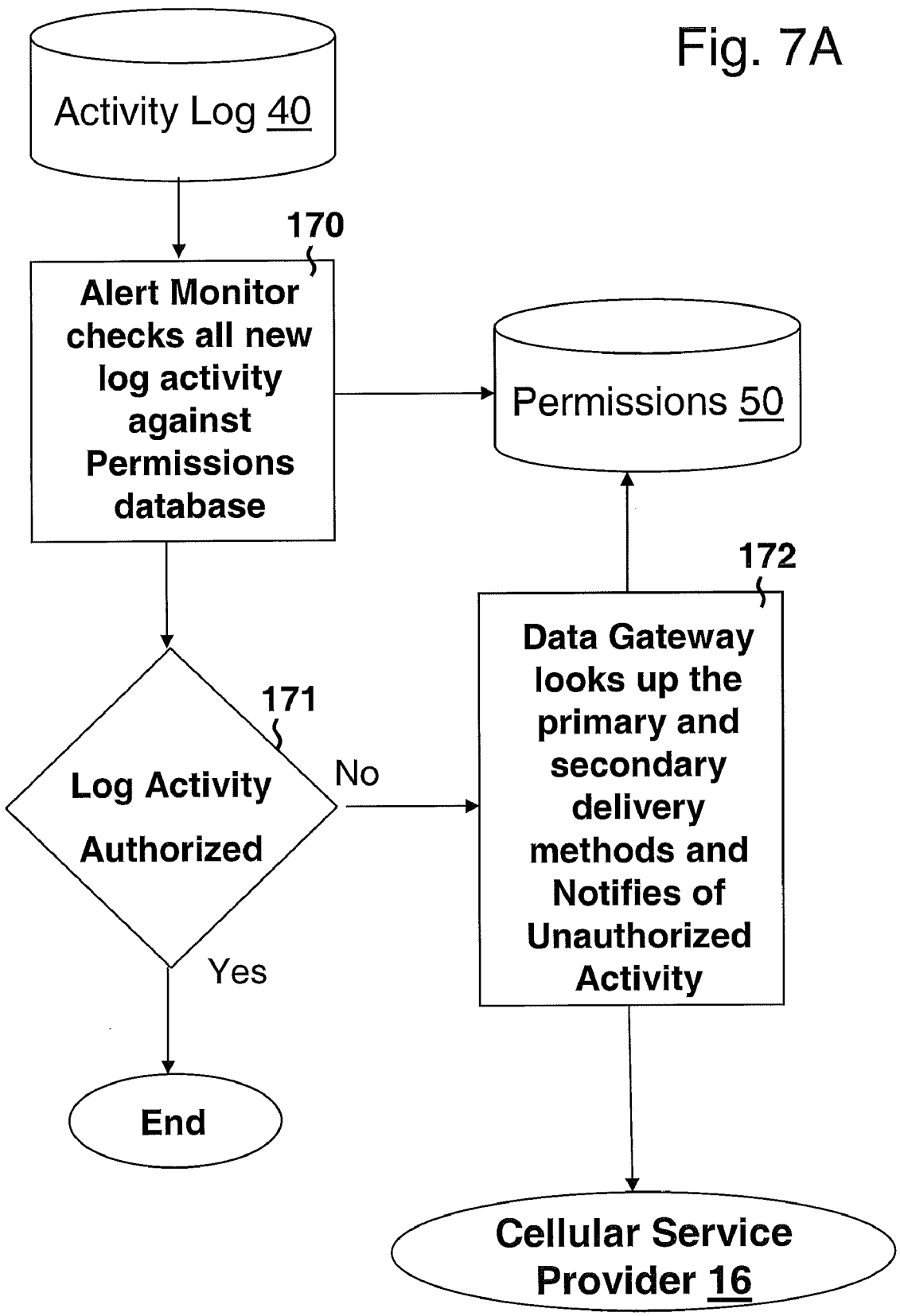
FIGS. 7A-7B illustrate exemplary flowcharts of the Alert Monitor tool of FIG. 1 in accordance with an embodiment of the present invention.
Figure 7B:
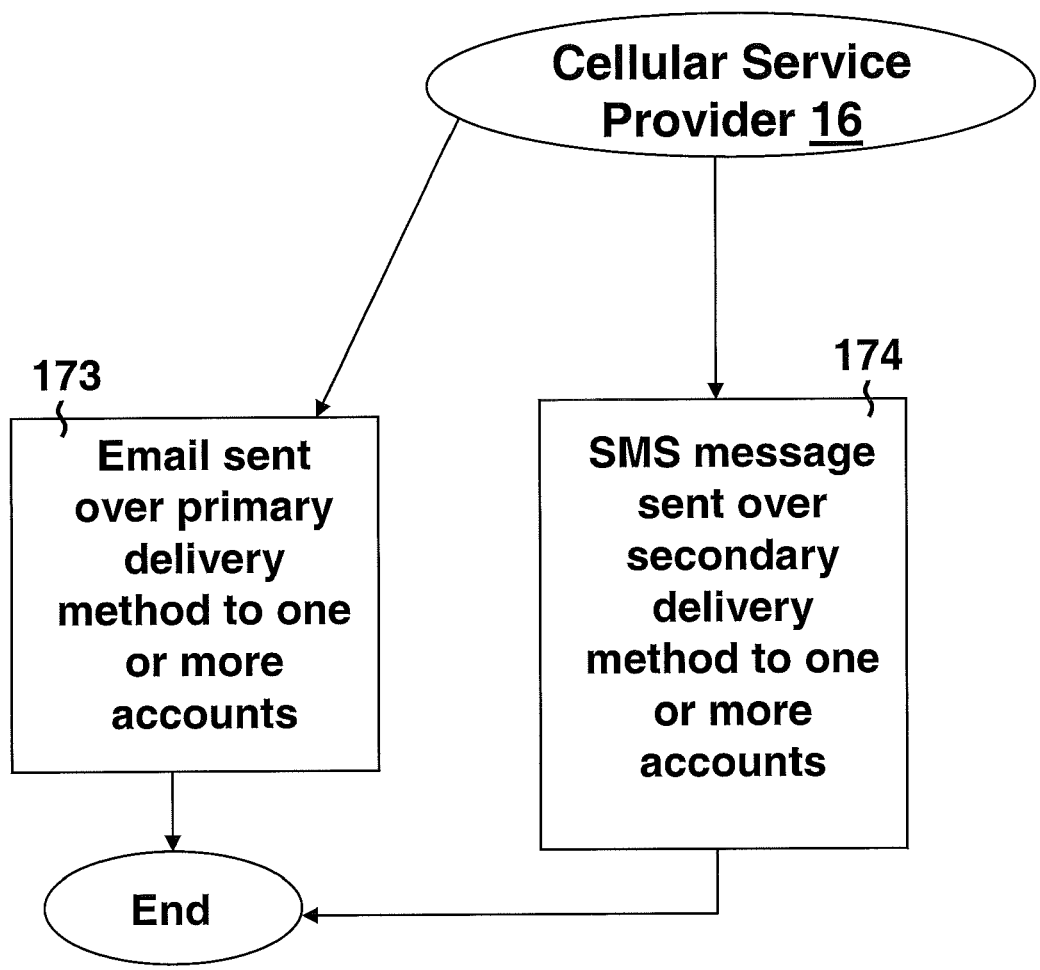

FIGS. 7A and 7B illustrate exemplary data flowcharts for the notification of unauthorized events on Mobile Communications Device 20 in accordance with an embodiment of the present invention. In Step 170, Alert Monitor 70 is monitoring the records being entered into Activity Log 40 database by Data Gateway 30. Each record is checked against Permissions 50 database. If the Log Activity is authorized (step 171), no further action is required.

If the Log Activity is not authorized (step 171), then Data Gateway 30 looks up the delivery notification method in Permissions 50 database (step 172) and sends an alert message via Cellular Service Provider 16 or alternately through any available communications network including for example PIN-to-PIN, Wi-Fi, Bluetooth, Personal Area Networks, Local Area Networks, and/or Public Networks (e.g., cellular networks, satellite networks, and/or the Internet) to one or more destinations. As an example, step 173 identifies an email message being sent to one of the users of the account while step 174 identifies an SMS text message being sent to an alternate user of the account. In accordance with one or more embodiments of the present invention, many forms of data communications may be supported, including for example voice messages, SMS Text Messages, email or any other publicly accepted machine-to-machine communications protocol.

FIG. 8 illustrates an exemplary data flowchart for the reporting or exporting of information stored in the Activity Log 40 database in accordance with one or more embodiments. For example, an administrator (e.g., user) of the application or system (e.g., of Data Center 17) may view the contents of Activity Log 40 and request an Activity Report 90 from the system (step 175). Alternatively or in addition, the administrator may be requested or may identify a situation where the content of Activity Log 40 contains evidence of a criminal act and is reported (step 176) via an electronic transmission to a Law Enforcement agency 95.

For example, the administrator may discover a photograph of child pornography (or other illegal activity) captured in an MMS message provided to the monitored mobile phone (e.g., Mobile Communications Device 20). This photograph along with the message headers, identifying source IDs and other evidentiary information may be filed, for example, electronically with the Center for Missing and Exploited Children or to the appropriate government agency. In general in accordance with one or more embodiments, Activity Report 90 and/or information provided to Law Enforcement agency 95 may satisfy chain of custody or other forms of custody of evidence requirements with respect to authenticity of the record or other information due to the signing (and possible encryption) of the information as discussed previously (e.g., in reference to FIGS. 3A-3O). Thus as disclosed herein, a report containing authenticating data may be generated (e.g., from activity logs) between Mobile Communications Device 20 and a third party, which may be utilized for example by the party monitoring Mobile Communications Device 20 and/or by law enforcement authorities or other entities (e.g., agencies or organizations) lawfully provided with the report.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
    a memory configured to store programs and database information;
    a processor, coupled to the memory, configured to access the database information and run the programs;
    a communication gateway, coupled to the processor and the memory, configured to receive information, including contextual information, on data service use from a mobile, wireless, communication device, being monitored by the system, configured to:
        monitor each data service use;
        compile the information associated with each data service use; and
        provide the information associated with each data service use to be received by the communication gateway;
    wherein the data service uses, for data services associated with the mobile, wireless, communication device, comprise:
        inbound and outbound communications of the mobile, wireless, communication device; and
        any addition, modification, and/or deletion within the mobile, wireless, communication device to application data, wherein the information associated with the data service uses comprise message information for a message application data service use, including at least one of associated originating or destination email address, username, or telephone number along with contextual data;
    wherein the database information comprises:
        an activity log database configured to store a signed entry for each data service use based on the information, including contextual information, received from the mobile, wireless, communication device; and
        a permissions database configured to store rules as to whether each data service use is allowed for the mobile, wireless, communication device; and
    wherein the programs comprise:
        an alert monitor program configured to compare the signed entry for each data service use stored in the activity log database to the associated rule stored in the permissions database and to provide an alert if the data service use of the mobile, wireless, communication device is not allowed.

2. The system of claim 1, wherein the memory, the processor, and the communication gateway form a data center for monitoring the data service uses;
    wherein the system further comprises the mobile, wireless, communication device, wherein the mobile, wireless, communication device includes a data monitor program configured to perform the monitoring of each data service use and the compiling of the information associated with each data service use;
    wherein the data service uses further comprise any addition, modification, and/or deletion within the mobile, wireless, communication device of an application; and
    wherein the information, including contextual information, comprises:
        telephone call information for a phone application data service use, including associated originating and/or destination telephone number and contextual data; and
        changes to application data information for at least one of an address book and/or a calendar along with contextual data.

3. The system of claim 1, wherein the data services associated with the mobile, wireless, communication device comprise a phone application and a short message service text application;
    wherein the alert monitor program is configured to analyze the contextual information along with an associated telephone number, email address, or username to determine if the data service use for the mobile, wireless, communication device is not allowed; and
    wherein the information includes identification of the mobile, wireless, communication device along with a date and time associated with the data service use.

4. The system of claim 3, wherein the data services associated with the mobile, wireless, communication device further comprise an email application, an address book application, a calendar application, a tasks application, an instant messaging application, and a multimedia application, and wherein the contextual information includes any combination of text, message content, files, pictures, and audio information associated with the data service uses.

5. The system of claim 1, wherein the database information further comprises:
    an address book database configured to store address book information of the mobile, wireless, communication device;
    a calendar database configured to store calendar information of the mobile, wireless, communication device; and
    wherein the alert monitor program determines whether the data service use is allowed based at least in part on whether an identity that is in communication with the mobile, wireless, communication device and associated with the data service use is found in the address book database.

6. The system of claim 5, wherein the database information further comprises a task database configured to store task information of the mobile, wireless, communication device, and wherein the information includes Internet access information, and new application installation information.

7. The system of claim 1, wherein the mobile, wireless, communication device comprises a cell phone, a personal digital assistant, or a Smartphone, and wherein the data services associated with the mobile, wireless communication device comprises a location determination application.

8. The system of claim 1, wherein the programs further comprise a data gateway program tool configured to route the information on the data service use received from the mobile, wireless, communication device being monitored to the memory and to route the alert from the alert monitor program to a designated external device.

9. The system of claim 1, wherein the system monitors communications to and from the mobile, wireless, communication device by monitoring the information on the data service uses to detect unauthorized activity, and wherein the system further provides web-based access to the database information for an administrator to review the information on the data service uses of the mobile, wireless, communication device and modify the corresponding rules.

10. The system of claim 1, wherein the information on the data service uses comprises inbound and outbound telephone voice information, inbound and outbound short message service text information, and changes to the application data within the mobile, wireless communication device, and wherein the alert monitor program is configured to analyze the contextual information to determine if the data service use for the mobile, wireless, communication device is not allowed, with the contextual information comprising any combination of text, files, pictures, and audio information associated with the data service uses.

11. The system of claim 10, wherein the information on the data service use further comprises a change to an address book, a change to a calendar, a change to a task, inbound and outbound email information, and inbound and outbound instant messaging information, and further includes inbound and outbound multimedia information, a web browser request, and/or an application installation.

12. The system of claim 11, wherein the alert is provided to the mobile, wireless, communication device to prevent the data service use that is not allowed based on the rules stored in the permissions database.

13. A mobile communications device comprising:
a memory configured to store programs and data;
a processor, coupled to the memory, configured to run the programs stored in the memory;
a communications port configured to wirelessly communicate with a data center; and
wherein the programs comprise a data monitor program configured to:
monitor data service uses of the mobile communications device;
compile signed information, including contextual information, of the data service uses; and
transmit the information to the data center via the communications port;
wherein the data service uses, for data services associated with the mobile communication device, comprise:
inbound and outbound communications of the mobile communication device;
any additions, modifications, and/or deletions within the mobile communication device of applications; and
any additions, modifications, and/or deletions within the mobile communication device to application data.

14. The mobile communications device of claim 13, wherein the data services comprise a phone application and/or a short message service text application, wherein the information comprises:

telephone call information for the phone application data service use, including associated originating or destination telephone number and contextual data;
messages information for the short message service text application data service use, including associated telephone number along with contextual data; and
wherein the contextual information comprises any combination of text, files, pictures, and audio information associated with the data service uses.

15. The mobile communications device of claim 14, wherein the data services further comprise an email application, an instant messaging application, an address book application, and a calendar application, and further comprise a tasks application, a web browser application, an installation application, and/or a multimedia application; and
wherein the information comprises:
email information for the email application data service use, including email address, date/time stamp, and contextual data;
instant messaging information for the instant messaging application data service use, including username, date/time stamp, and contextual data;
address book information for the address book application data service use, including date/time stamp and contextual data associated with the address book addition, modification, and/or deletion;
calendar information for the calendar application data service use, including date/time stamp and contextual data associated with the calendar addition, modification, and/or deletion;
task information for the task application data service use, including date/time stamp and contextual data associated with the task addition, modification, and/or deletion;
web browser information for the web browser application data service use, including date/time stamp, uniform resource locator, and contextual data;
installation application information for the installation application data service use, including date/time stamp and contextual data associated with the installation application addition, modification, and/or deletion; and
multimedia application information for the multimedia application data service use, including date/time stamp and contextual data associated with the multimedia application addition, modification, and/or deletion.

16. The mobile communications device of claim 13, wherein the mobile communication device comprises a cell phone, a personal digital assistant, or a Smartphone, and wherein the data services for the mobile, wireless communication device comprise a location determination application.

17. The mobile communications device of claim 13, wherein the data monitor program is further configured to prevent an unauthorized data service use based on information received from the data center via the communications port.

18. A method of monitoring a mobile communication device configured to monitor each data service use, compile information associated with each data service use, and provide the information associated with each data service use to a remote data center, the method comprising:
storing rules associated with the data service uses for the mobile communication device at the remote data center, wherein the data service uses, for data services associated with the mobile communication device, comprise:

inbound and outbound communications of the mobile communication device;
any additions, modifications, and/or deletions within the mobile communication device to applications; and
any additions, modifications, and/or deletions within the mobile communication device to application data;
receiving the information for one of the data service uses from the mobile communication device;
signing the information;
storing the signed information for the data service use;
checking the data service use based on the information to the corresponding rule associated with the data service use; and
providing an alert if the data service use is unauthorized based on the corresponding rule.

19. The method of claim 18, further comprising providing the alert to the mobile communication device to prevent the data service use that is unauthorized, wherein the information includes contextual information that includes any combination of text, message content, files, pictures, and audio information associated with the data service uses, and wherein the checking is based at least in part on whether an identity that is in communication with the mobile communication device and associated with the data service use is an authorized entry within an address book associated with the mobile communication device.

20. The method of claim 18, further comprising providing the alert to an administrator to notify of the data service use that is unauthorized, and wherein the checking analyzes the information, which includes contextual information, to determine if the data service use for the mobile communication device is unauthorized.

21. The method of claim 18, wherein the data service uses comprise a phone application use, a short message service text application use, and an email application use, wherein the checking is based at least in part on whether an identity that is in communication with the mobile communication device and associated with the data service use is an authorized entry within an address book associated with the mobile communication device, and wherein the information comprises:
telephone call information for a phone application data service use, including associated originating or destination telephone number and contextual data; and
messages information for a message application data service use, including at least one of associated originating or destination email address, username, or telephone number along with contextual data.

22. The method of claim 21, wherein the data service uses comprise an instant messaging application use, an address book application use, a calendar application use, and a tasks application use, and further comprise an installation application use, a web browser application use, and/or a multimedia application use, and wherein the information comprises:
changes to application data information for at least one of an address book or a calendar along with contextual data;
instant messaging information for the instant messaging application data service use, including username, date/time stamp, and contextual data;
task information for the task application data service use, including date/time stamp and contextual data associated with the task addition, modification, and/or deletion;
web browser information for the web browser application data service use, including date/time stamp, uniform resource locator, and contextual data;
installation application information for the installation application data service use, including date/time stamp and contextual data associated with the installation application addition, modification, and/or deletion; and
multimedia application information for the multimedia application data service use, including date/time stamp and contextual data associated with the multimedia application addition, modification, and/or deletion.

23. The method of claim 18, wherein the mobile communication device comprises a cell phone, a personal digital assistant, or a Smartphone, wherein the data service use for the mobile, wireless communication device comprises a location determination application, and wherein the information includes identification of the mobile communication device along with a date and time associated with the data service use.

24. The method of claim 18, further comprising providing for an administrator web-based access to the rules and the data service uses stored and permitting the administrator to modify the rules, and wherein the information comprises contextual information that includes any combination of text, message information, files, pictures, and audio information associated with the data service uses.

25. A method of monitoring a mobile communication device, the method comprising:
monitoring data service uses of the mobile communication device, wherein the data service uses, for data services associated with the mobile communication device, comprise:
inbound and outbound communications of the mobile communication device; and
any additions, modifications, and/or deletions within the mobile communication device to application data;
detecting an initiation of one of the data services;
capturing information, including any contextual information, associated with the data service use based on the detecting, wherein the information associated with the data service uses comprise message information for a message application data service use, including at least one of associated originating or destination email address, username, or telephone number along with contextual data, wherein the data service uses comprise a phone application use and/or a short message service text application use, and wherein the contextual information comprises any combination of text, files, pictures, and audio information associated with the data service uses;
compiling and signing the information based on the capturing to provide signed information; and
transmitting the signed information of the data service use to a data center to store the signed information.

26. The method of claim 25, wherein the information comprises telephone call information for a phone application data service use, including associated originating or destination telephone number and contextual data.

27. The method of claim 26, wherein the data service uses further comprise any addition, modification, and/or deletion within the mobile, wireless, communication device of an application, wherein the data service uses further comprise an email application use, an instant messaging application use, an address book application use, and a calendar application use, and further comprise a tasks application use, a web browser application use, an installation application use, and/or a multimedia application use, and wherein the information comprises:

email information for the email application data service use, including email address, date/time stamp, and contextual data;
instant messaging information for the instant messaging application data service use, including username, date/time stamp, and contextual data;
address book information for the address book application data service use, including date/time stamp and contextual data associated with the address book addition, modification, and/or deletion;
calendar information for the calendar application data service use, including date/time stamp and contextual data associated with the calendar addition, modification, and/or deletion;
task information for the task application data service use, including date/time stamp and contextual data associated with the task addition, modification, and/or deletion;
web browser information for the web browser application data service use, including date/time stamp, uniform resource locator, and contextual data;
installation application information for the installation application data service use, including date/time stamp and contextual data associated with the installation application addition, modification, and/or deletion; and
multimedia application information for the multimedia application data service use, including date/time stamp and contextual data associated with the multimedia application addition, modification, and/or deletion.

28. The method of claim 25, wherein the mobile communication device comprises a cell phone, a personal digital assistant, or a Smartphone, and wherein the data service use for the mobile, wireless communication device comprises a location determination application use.

29. The method of claim 25, further comprising:
receiving from the data center authorization information regarding the data service use; and
preventing the data service use if the authorization information indicates that the data service use is unauthorized.

30. A computer-readable medium on which is stored a non-transitory computer program for performing a method of monitoring a mobile communication device configured to monitor each data service use, compile information associated with each data service use, and provide the information associated with each data service use to a remote data center, the method comprising:
storing rules associated with the data service uses for the mobile communication device at the remote data center, wherein the data service uses, for data services associated with the mobile communication device, comprise:
inbound and outbound communications of the mobile communication device;
any additions, modifications, and/or deletions within the mobile communication device to applications; and
any additions, modifications, and/or deletions within the mobile communication device to application;
receiving the information for one of the data service uses from the mobile communication device, wherein the information comprises messages information for a message application data service use, including at least one of associated originating and/or destination email address, username, and/or telephone number along with contextual data;
storing the information with a signature for the data service use;
checking the data service use based on the information to the corresponding rule associated with the data service use; and
providing an alert if the data service use is unauthorized based on the corresponding rule.

31. The method of claim 30, further comprising providing the alert to the mobile communication device to prevent the data service use that is unauthorized, wherein the contextual information includes any combination of text, message content, files, pictures, and audio information associated with the data service uses, and wherein the checking is based at least in part on whether an identity that is in communication with the mobile communication device and associated with the data service use is an authorized entry within an address book associated with the mobile communication device.

32. The method of claim 30, further comprising providing the alert to an administrator to notify of the data service use that is unauthorized, and wherein the checking analyzes the information, which includes contextual information, to determine if the data service use for the mobile communication device is unauthorized.

33. The method of claim 30, wherein the data service uses comprise a phone application use, a short message service text application use, and an email application use, and wherein the checking is based at least in part on whether an identity that is in communication with the mobile communication device and associated with the data service use is an authorized entry within an address book associated with the mobile communication device, and wherein the information comprises telephone call information for a phone application data service use, including associated originating or destination telephone number and contextual data.

34. The method of claim 33, wherein the data service uses comprise an email application use, an instant messaging application use, an address book application use, a calendar application use, and a tasks application use, and further comprise an installation application use, a web browser application use, and/or a multimedia application use, and wherein the information comprises:
changes to application data information for at least one of an address book or a calendar along with contextual data;
instant messaging information for the instant messaging application data service use, including username, date/time stamp, and contextual data;
task information for the task application data service use, including date/time stamp and contextual data associated with the task addition, modification, and/or deletion;
web browser information for the web browser application data service use, including date/time stamp, uniform resource locator, and contextual data;
installation application information for the installation application data service use, including date/time stamp and contextual data associated with the installation application addition, modification, and/or deletion; and
multimedia application information for the multimedia application data service use, including date/time stamp and contextual data associated with the multimedia application addition, modification, and/or deletion.

35. A computer-readable medium on which is stored a non-transitory computer program for performing a method of monitoring a mobile communication device, the method comprising:

monitoring data service uses of the mobile communication device, wherein the data service uses, for data services associated with the mobile communication device, comprise:
  inbound and outbound communications of the mobile communication device;
    any additions, modifications, and/or deletions within the mobile communication device to applications; and
    any additions, modifications, and/or deletions within the mobile communication device to application data;
  detecting an initiation of one of the data services;
  capturing information, including any contextual information, associated with the data service use based on the detecting, wherein the information associated with the data service uses comprise message information for a message application data service use, including at least one of associated originating or destination email address, username, or telephone number along with contextual data, wherein the data service uses comprise a phone application use and/or a short message service text application use, and wherein the contextual information comprises any combination of text, files, pictures, and audio information associated with the data service uses;
  compiling and signing the information based on the capturing to provide signed information; and
  transmitting the signed information of the data service use to a data center to store the signed information having a digital signature.

36. The method of claim 35, wherein the information comprises telephone call information for a phone application data service use, including associated originating or destination telephone number and contextual data.

37. The method of claim 36, wherein the data service uses further comprise an email application use, an instant messaging application use, an address book application use, and a calendar application use, and further comprise a tasks application use, a web browser application use, an installation application use, and/or a multimedia application use, and wherein the information comprises:
  email information for the email application data service use, including email address, date/time stamp, and contextual data;
  instant messaging information for the instant messaging application data service use, including username, date/time stamp, and contextual data;
  address book information for the address book application data service use, including date/time stamp and contextual data associated with the address book addition, modification, and/or deletion;
  calendar information for the calendar application data service use, including date/time stamp and contextual data associated with the calendar addition, modification, and/or deletion;
  task information for the task application data service use, including date/time stamp and contextual data associated with the task addition, modification, and/or deletion;
  web browser information for the web browser application data service use, including date/time stamp, uniform resource locator, and contextual data;
  installation application information for the installation application data service use, including date/time stamp and contextual data associated with the installation application addition, modification, and/or deletion; and
  multimedia application information for the multimedia application data service use, including date/time stamp and contextual data associated with the multimedia application addition, modification, and/or deletion.

38. The method of claim 35, further comprising:
  receiving from the data center authorization information regarding the data service use; and
  preventing the data service use if the authorization information indicates that the data service use is unauthorized.

* * * * *